(12) United States Patent
Bhattacharyya et al.

(10) Patent No.: US 11,016,676 B2
(45) Date of Patent: May 25, 2021

(54) SPOT COALESCING OF DISTRIBUTED DATA CONCURRENT WITH STORAGE I/O OPERATIONS

(71) Applicant: Nutanix, Inc., San Jose, CA (US)

(72) Inventors: Manosiz Bhattacharyya, San Jose, CA (US); Bharat Kumar Beedu, Santa Clara, CA (US); Parthasarathy Ramachandran, Palo Alto, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/019,319

(22) Filed: Feb. 9, 2016

(65) Prior Publication Data
US 2020/0034049 A1 Jan. 30, 2020

(51) Int. Cl.
*G06F 3/06* (2006.01)

(52) U.S. Cl.
CPC ............ *G06F 3/0619* (2013.01); *G06F 3/061* (2013.01); *G06F 3/064* (2013.01); *G06F 3/0673* (2013.01)

(58) Field of Classification Search
CPC .... G06F 3/064; G06F 3/0646; G06F 12/0646; G06F 3/0619; G06F 3/061; G06F 3/0673
See application file for complete search history.

(56) References Cited

U.S. PATENT DOCUMENTS

| | | | |
|---|---|---|---|
| 7,562,203 B2 * | 7/2009 | Scott | G06F 3/0608 711/112 |
| 8,019,799 B1 * | 9/2011 | Batterywala | G06F 17/30067 707/822 |
| 8,549,518 B1 | 10/2013 | Aron et al. | |
| 8,601,473 B1 | 12/2013 | Aron et al. | |
| 8,688,660 B1 * | 4/2014 | Sivasubramanian | G06F 3/0619 707/703 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Sanjiv Shah
*Assistant Examiner* — Alexander J Yoon
(74) *Attorney, Agent, or Firm* — Vista IP Law Group, LLP

(57) ABSTRACT

Systems, methods, and computer program products for distributed data storage. A spot defragmentation method commences upon receiving an incoming storage I/O command to access a subject logical object that is composed of subject logical data blocks. The method continues by retrieving a block map that characterizes spatial relationships between the subject logical data blocks and instances of respective subject physical data blocks that store the subject logical object on a storage device. During processing of the incoming storage I/O command, the method determines occurrences of, and locations of one or more fragmented physical data blocks. A defragmentation operation is initiated to coalesce the fragmented physical data blocks to another location. The defragmentation operation is initiated before completing the storage I/O command. In some instances, defragmentation operations are performed over a snapshot file such that upon completing the defragmentation operations and/or spot coalesce operations, the snapshot file can be deleted.

25 Claims, 15 Drawing Sheets

(56) References Cited

U.S. PATENT DOCUMENTS

| | | | |
|---|---|---|---|
| 8,850,130 | B1 | 9/2014 | Aron et al. |
| 8,997,097 | B1 | 3/2015 | Aron et al. |
| 9,052,936 | B1 | 6/2015 | Aron et al. |
| 9,208,081 | B1* | 12/2015 | Dice .................. G06F 12/0269 |
| 9,256,374 | B1 | 2/2016 | Aron et al. |
| 9,256,475 | B1 | 2/2016 | Aron et al. |
| 9,354,912 | B1 | 5/2016 | Aron et al. |
| 9,389,887 | B1 | 7/2016 | Aron et al. |
| 9,575,784 | B1 | 2/2017 | Aron et al. |
| 9,619,257 | B1 | 4/2017 | Aron et al. |
| 9,772,866 | B1 | 9/2017 | Aron et al. |
| 2003/0189774 | A1* | 10/2003 | Hamaguchi ............ G11B 5/012 360/13 |
| 2005/0228963 | A1* | 10/2005 | Rothman ............... G06F 3/0613 711/170 |
| 2006/0149899 | A1* | 7/2006 | Zimmer ................ G06F 3/0607 711/112 |
| 2009/0254594 | A1* | 10/2009 | Burchall ........... G06F 17/30135 |
| 2009/0300318 | A1* | 12/2009 | Allen .................. G06F 12/0246 711/206 |
| 2009/0327370 | A1* | 12/2009 | Schmidt ................ G06F 3/0613 |
| 2012/0117322 | A1* | 5/2012 | Satran .................. G06F 3/0625 711/114 |
| 2015/0095292 | A1* | 4/2015 | Dryfoos ............ G06F 17/30135 707/693 |
| 2017/0337212 | A1* | 11/2017 | Hayasaka ............... G06F 3/061 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

SPOT COALESCING OF DISTRIBUTED DATA CONCURRENT WITH STORAGE I/O OPERATIONS

FIELD

This disclosure relates to distributed data storage, and more particularly to techniques for performing spot defragmentation of stored data during timeframes that are concurrent with storage operations.

BACKGROUND

The use of virtual machines (VMs) to improve the usage and ease-of-use of computing resources continues to increase as has the proliferation of distributed storage systems. Distributed storage systems have evolved to comprise autonomous nodes that facilitate incremental and/or linear scaling. One benefit of such distributed storage systems is the ability to distribute stored data throughout the nodes in a given cluster. Distribution of data can be used in approaches to scale storage capacity (e.g., in order to improve performance and reliability). Many distributed storage systems might further implement data protection features such as data snapshotting that serve to capture the state of stored data at a particular time. Such snapshots can serve as restorable copies of various sets of data, which in turn can be used for data protection (e.g., crash recovery, corrupted file recovery, etc.).

Unfortunately, the foregoing techniques for distribution of data and/or snapshotting of data in distributed storage systems suffer limitations on scalability and performance, at least in their ability to manage the fragmentation of data across multiple physical storage devices. Such data fragmentation can result in increased latency and/or lower overall performance and/or decreased storage facility utilization. Legacy background defragmentation techniques can operate asynchronously to the storage I/O (input/output or IO) operations, however, such background techniques can result in the movement of large regions of data, including regions that might not necessarily be accessed on a regular basis. Such legacy background defragmentation consumes a large amount of computing resources while, in many cases, delivering only a minimal improvement in ongoing storage I/O performance. Background defragmentation techniques also suffer from operational lag and/or temporary suspension of ongoing storage I/O activity (e.g., when attempting to access fragmented data) leading to degraded performance. In some cases, background defragmentation might also incur accesses of stale metadata and/or stale data (e.g., data pertaining to obsolete snapshots), thus unnecessarily consuming computing resources. What is needed is a way to perform defragmentation operations during the performance of I/O operations (e.g., storage I/O commands) as may be invoked by ongoing system operations such as running applications or performing system maintenance operations.

What is needed is a technique or techniques to improve over legacy approaches.

BRIEF DESCRIPTION OF THE DRAWINGS

The drawings described below are for illustration purposes only. The drawings are not intended to limit the scope of the present disclosure.

DETAILED DESCRIPTION

Figure 1A:
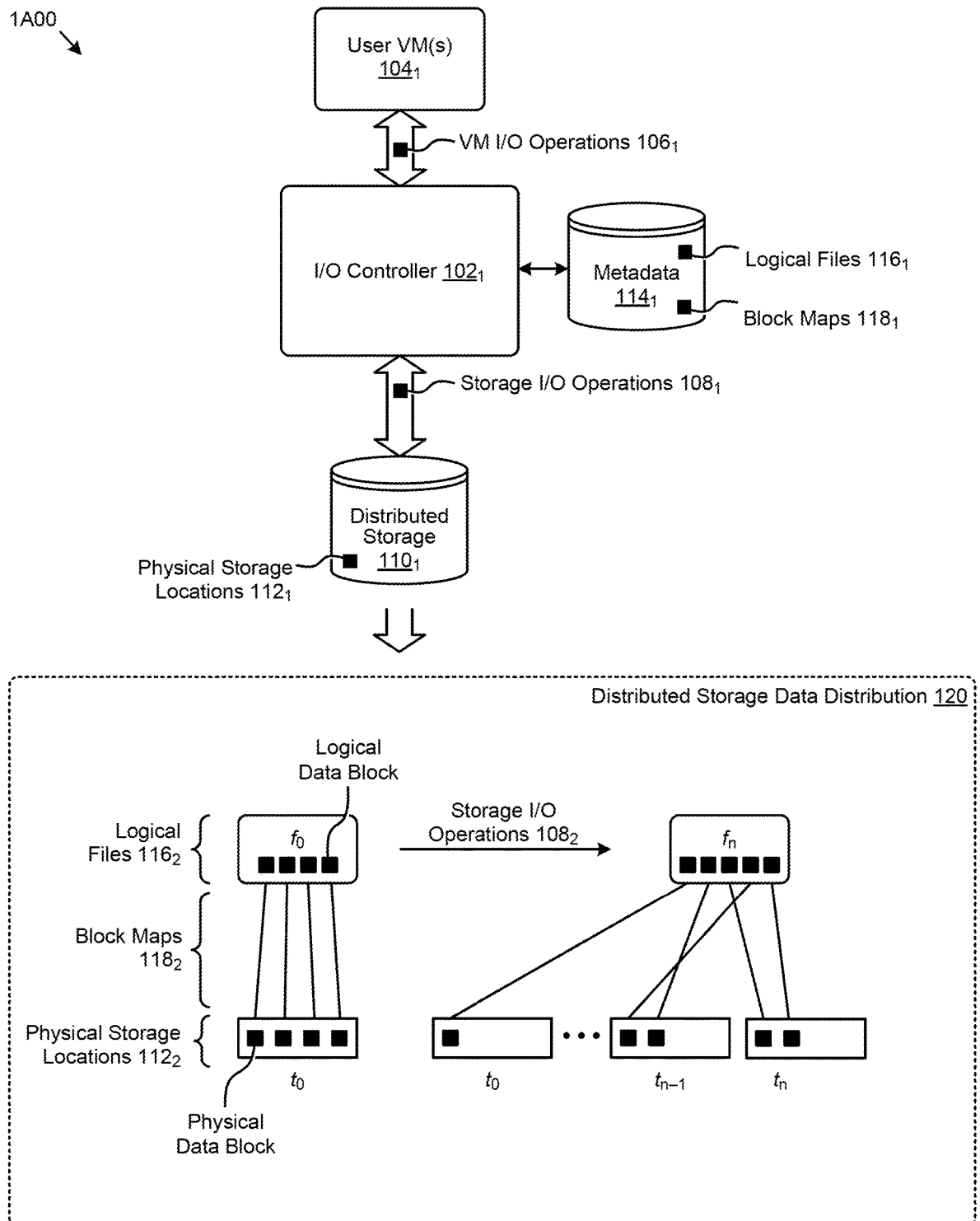
FIG. 1A presents a distributed data fragmentation scenario.

Some embodiments of the present disclosure address the problem of defragmenting associated data fragmented across multiple physical storage devices in a highly active storage I/O distributed storage environment and some embodiments are directed to approaches for performing a spot defragmentation of fragmented data near a subject region in response to a storage I/O operation associated with the same subject region.

Overview

Disclosed herein are techniques for performing a spot defragmentation of fragmented data near a subject region (e.g., "spot") in response to a storage I/O operation associated with the same subject region. In one or more embodiments, the regions near the subject region are analyzed to identify the fragmented data. Metadata fetched for the storage I/O operation can be used to analyze the regions for defragmentation purposes. In some cases, spot defragmentation operations are performed when the fragmented data is associated with a snapshot that is marked for deletion. In one or more embodiments, the fragmented data that is identified as being needed for a defragmentation operation (e.g., to move the fragmented data to another location) is available in cache storage as a consequence of executing the storage I/O operation. Such techniques disclosed herein facilitate spot defragmentation at the time storage I/O operations are invoked. Performing the spot defragmentation concurrently with or during the performance of a requested storage I/O operation can result in ongoing defragmentation of distributed data, without introducing additional latency, and while using only minimal resources beyond the resources needed to perform the requested storage I/O operation.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A presents a distributed data fragmentation scenario 1A00. As an option, one or more variations of distributed data fragmentation scenario 1A00 or any aspect thereof may be implemented in the context of the architecture and functionality of the embodiments described herein. Also, the distributed data fragmentation scenario 1A00 or any aspect thereof may be implemented in any environment.

Each node in a cluster of a distributed computing and storage system might process I/O (input/output or IO) using an I/O controller $102_1$ that services a set of user VMs $104_1$. Certain instances of VM I/O operations $106_1$ can be issued by the user VMs $104_1$ to perform various computing and/or storage operations, such as storage I/O operations $108_1$ (e.g., data read, data write, etc.). Data associated with each of the user VMs $104_1$ can be stored by the I/O controller $102_1$ in distributed storage $110_1$. In some cases, the distributed storage $110_1$ can comprise various physical storage devices (e.g., PCIe SSD devices, SSD devices, HDD devices, etc.) that span multiple nodes in the cluster to provide multiple instances of physical storage locations $112_1$. For example, the I/O controller $102_1$ might make a determination for a given instance of the storage I/O operations $108_1$ (e.g., write command) as to which instance of the physical storage locations $112_1$ in the cluster to store the corresponding write data. Such distribution of data can be used to approach a uniform local storage capacity utilization among the nodes in order to improve performance. A set of metadata $114_1$ holds virtual or logical representations of the data in a set of logical objects (e.g., logical files $116_1$, images, sounds, web pages, database files, virtual disks or vDisks, etc.) to simplify data access by the user VMs $104_1$ and/or for other purposes (e.g., snapshotting). A set of block maps $118_1$ can also be stored in the metadata $114_1$ to map the logical files $116_1$ to their corresponding instances of physical storage locations $112_1$.

The distributed storage data distribution 120 shown in FIG. 1A illustrates the relationship between the logical files $116_2$ and the physical storage locations $112_2$ over time. Specifically, a logical file $f_0$ comprising four logical data blocks of logically contiguous data might be created at time $t_0$. As shown by the block maps $118_2$, the logical file $f_0$ is initially stored in one physical storage location comprising contiguous physical data blocks. Following a series of storage I/O operations $108_2$ through a time $t_n$, the most recent instance $f_n$ of the logical file might be mapped to multiple physical storage locations. For example, in the course of various block create, update, and/or delete operations, the I/O controller $102_1$ might have determined to store the created and/or updated data blocks in various physical storage locations. As shown, the logical file $f_n$ is mapped to at least three physical locations. One or more instances of a block map (e.g., see block maps $118_2$) might include characterization of any of a variety of spatial relationships (e.g., spatial relationships that refer to physical characteristics such as "adjacent to", "same sector", "same track", "same volume", "spanning file", "spanning volume", etc.)

Such a separation of logically contiguous data blocks across multiple physical storage locations can be referred to as fragmentation. In some cases, a measure of fragmentation can be based on the number of physical locations (e.g., nodes, SSDs, partitions, regions, etc.) associated with a given logical file and/or files (e.g., vDisks). In other cases, a measure of fragmentation might be based on the access latency performance degradation affected by the fragmentation. Specifically, fragmentation of associated data across multiple physical storage devices and/or locations can significantly impact access latency performance in highly active storage I/O distributed storage environments. Such performance issues can be addressed by the herein disclosed techniques as described in FIG. 1B.

Figure 1B:
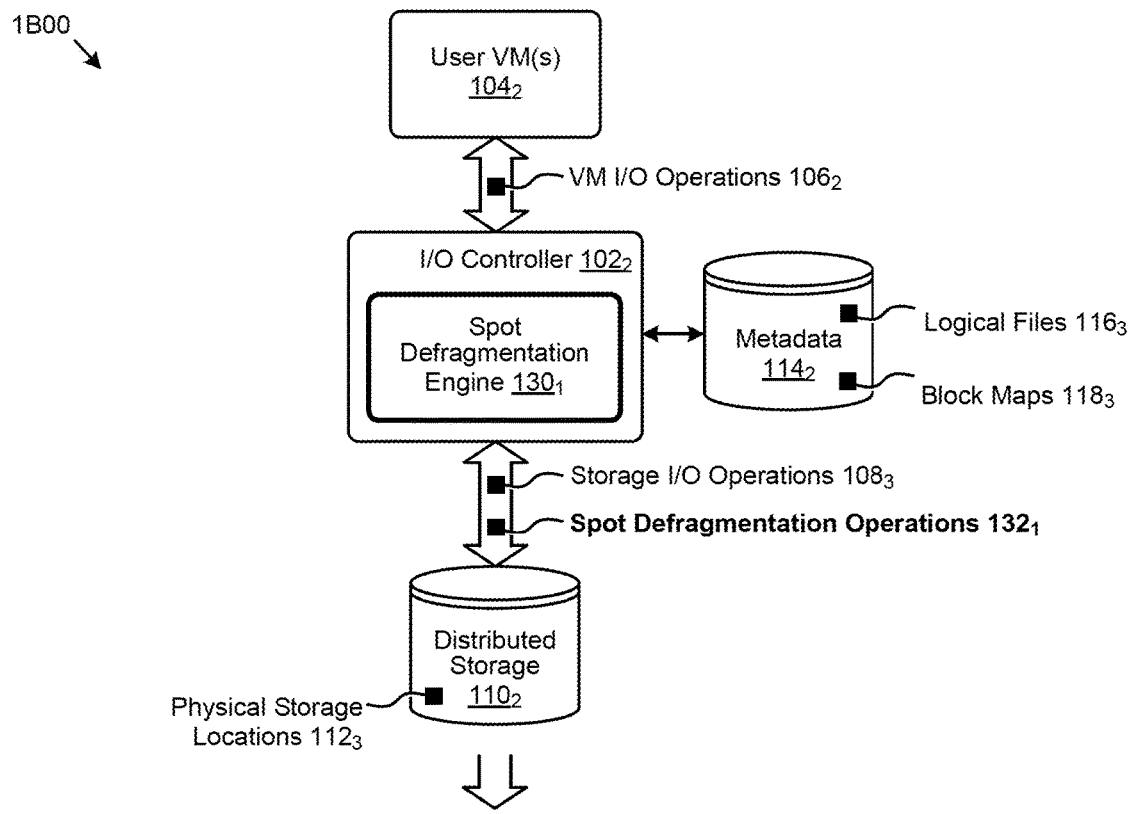
FIG. 1B illustrates a spot defragmentation scenario facilitated by systems implementing spot defragmentation of stored data by operations that are concurrent with storage operations, according to an embodiment.
Figure 1B:
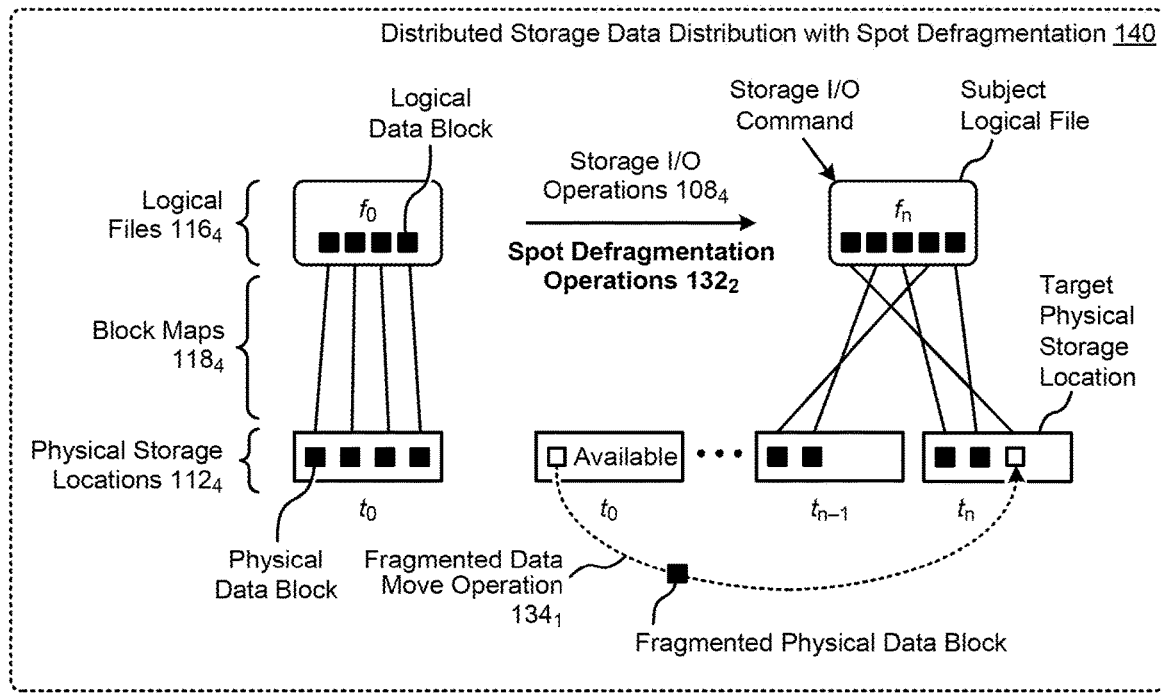

FIG. 1B illustrates a spot defragmentation scenario 1B00 facilitated by systems implementing spot defragmentation of stored data by operations that are concurrent with storage operations. As an option, one or more variations of spot defragmentation scenario 1B00 or any aspect thereof may be implemented in the context of the architecture and functionality of the embodiments described herein. Also, the spot defragmentation scenario 1B00 or any aspect thereof may be implemented in any environment.

The spot defragmentation scenario 1B00 illustrates one embodiment and resulting effect of the implementation of the herein disclosed techniques for spot defragmentation. Specifically, the spot defragmentation scenario 1B00 depicts an I/O controller $102_2$ that services a set of VM I/O operations $106_2$ from a set of user VMs $104_2$ to perform various computing and/or storage operations, such as storage I/O operations $108_3$. A set of metadata $114_2$ comprising logical files $116_3$ and block maps $118_3$ can be used by the I/O controller $102_2$ to facilitate data storage in distributed storage $110_2$ comprising a set of physical storage locations $112_3$. Further, in some embodiments, the I/O controller $102_2$ can comprise a spot defragmentation engine $130_1$ used to facilitate the herein disclosed techniques. The spot defragmentation engine $130_1$ can generate and/or execute certain instances of spot defragmentation operations $132_1$ for defragmenting and/or coalescing fragmented data in distributed storage $110_2$.

Such defragmentation and/or coalescing of fragmented data is illustrated in the distributed storage data distribution with spot defragmentation 140 shown in FIG. 1B. Specifically, the distributed storage data distribution with spot defragmentation 140 illustrates the relationship between the logical files $116_4$ and the physical storage locations $112_4$ over time when implementing the herein disclosed techniques. More specifically, a logical file $f_0$ comprising four logical data blocks of logically contiguous data might be created at time $t_0$. As shown by the block maps $118_4$, the logical file $f_0$ is initially stored in one physical storage location comprising contiguous physical data blocks. A series of storage I/O operations $108_4$ through a time $t_0$ might cause a fragmentation of the data associated with a most recent instance $f_n$ of the logical file, yet certain instances of spot defragmentation operations $132_2$ can reduce such fragmentation.

For example, in comparison to the distributed data fragmentation scenario 1A00, the spot defragmentation operations $132_2$ can identify the fragmented physical data block from the physical storage location established at time $t_0$ as a candidate for defragmentation. The spot defragmentation operations $132_2$ can further perform a fragmented data move operation $134_1$ to move the identified data block to a target physical storage location physically near and/or contiguous with more recently written data blocks (e.g., the physical storage location established at time $t_n$). The spot coalesce of the fragmented physical data block associated with the fragmented data move operation $134_1$ can facilitate improved latency when accessing the fragmented physical data block, yet also avail the physical storage location established at time $t_0$ for use by the distributed storage system.

In some embodiments, one or more instances of the spot defragmentation operations $132_2$ can be invoked and/or executed concurrently with one or more instances of the storage I/O operations $108_4$. For example, certain instances of spot defragmentation operations $132_2$ might be invoked with a storage I/O command (e.g., data read command, data write command) associated with a subject logical object. In such cases, the spot defragmentation operations $132_2$ can use certain information availed by the storage I/O operations $108_4$ (e.g., metadata, prefetched data, etc.) to improve the efficiency of the defragmentation process. In some cases, the spot defragmentation operations $132_2$ might complete execution before the storage I/O operations $108_4$ have completed execution. In other cases, the spot defragmentation operations $132_2$ might complete execution after the storage I/O operations $108_4$ have completed execution.

As earlier mentioned, the problems attendant to fragmentation of associated data across multiple physical storage devices addressed by the herein disclosed techniques can be prevalent in highly active storage I/O distributed storage environments. Such environments are shown and described as follows.

FIG. 2A, FIG. 2B, FIG. 2C, and FIG. 2D depict partitioning of components and functions within environments in which embodiments of the present disclosure can operate. As an option, one or more variations of the partitions or variations of the environments or any aspect thereof may be implemented in the context of the architecture and functionality of the herein disclosed systems and techniques.

As shown in the partitioning 2A00, a group of nodes (e.g., node1 $202_1$, node2 $202_2$, ..., nodeN $202_N$) can form a distributed storage and compute platform that comprises a distributed storage fabric 210. The distributed storage fabric 210 can appear to an instance of a hypervisor (e.g., hypervisor $204_1$, hypervisor $204_2$, ..., hypervisor $204_N$) and associated user virtual machines (e.g., user VMs $104_3$, user VMs $104_4$, ..., user VMs $104_N$, respectively) at each node as a centralized storage array, yet the storage I/O operations included in the VM I/O operations (e.g., VM I/O operations $106_3$, VM I/O operations $106_4$, ..., VM I/O operations $106_N$, respectively) can be processed local to each node by a local I/O controller (e.g., I/O controller $102_3$, I/O controller $102_4$, ..., I/O controller $102_N$, respectively) to provide the highest performance. The distributed storage fabric 210 can be scaled by adding more nodes (see scale 220).

The hypervisor at each node can be an industry standard hypervisor (e.g., ESXi, KVM, Hyper-V, etc.). The I/O controllers at each node can process the VM I/O operations for the respective hypervisor and user VMs. In some cases, the I/O controllers can interface with respective device controllers (e.g., device controller $206_1$, device controller $206_2$, ..., device controller $206_N$), which manage the storage facilities (e.g., SSD devices, HDD devices, etc.). In some embodiments, instances of the spot defragmentation engine (e.g., spot defragmentation engine $130_2$, spot defragmentation engine $130_3$, ..., spot defragmentation engine $130_N$) can be included in a respective instance of the I/O controller (e.g., I/O controller $102_3$, I/O controller $102_4$, ..., I/O controller $102_N$, respectively) as shown. Further, an instance of the earlier mentioned metadata (e.g., metadata $114_3$, metadata $114_4$, ..., metadata $114_N$) can be stored on one or more SSD devices at each node.

Figure 2A:
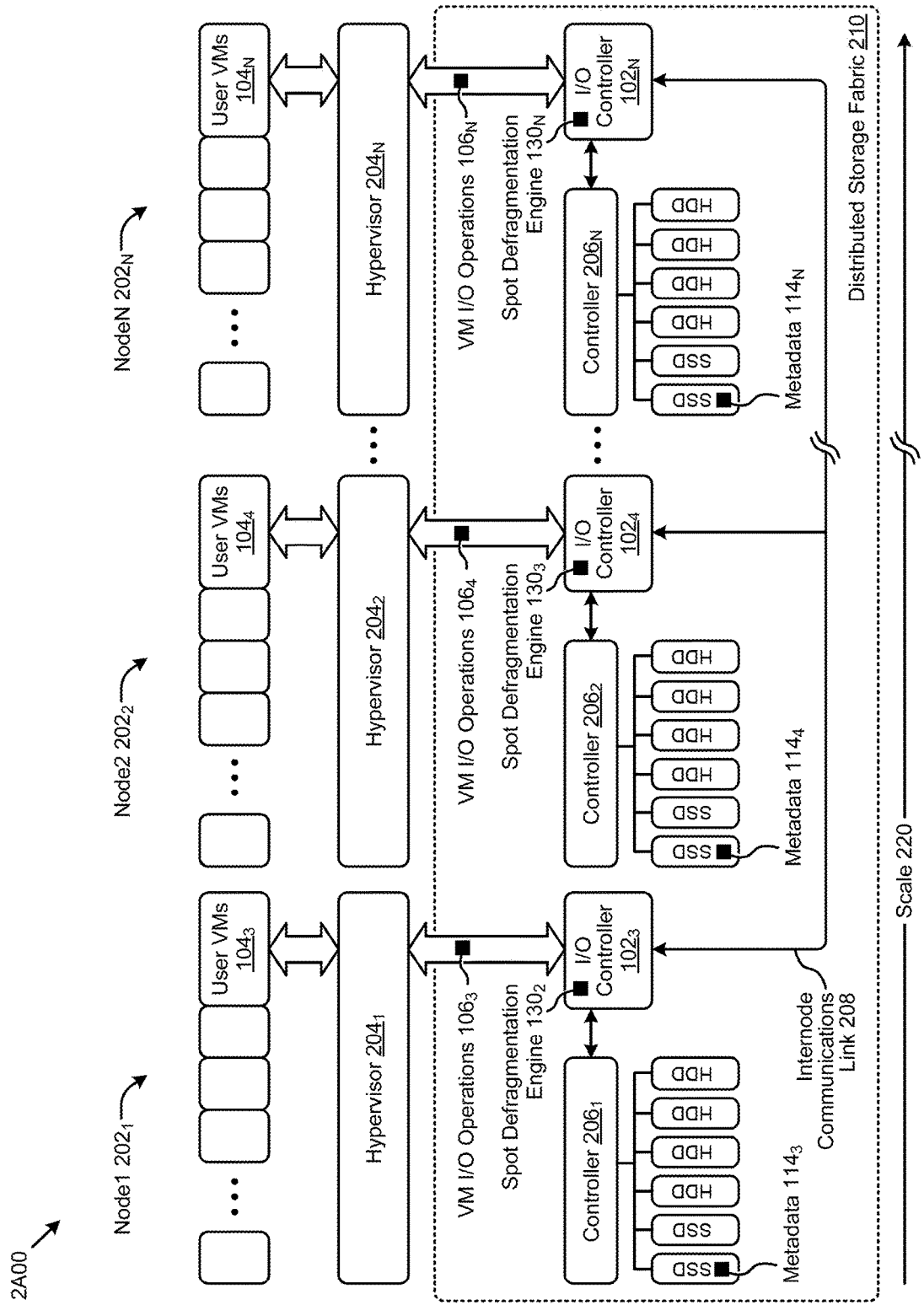
FIG. 2A, FIG. 2B, FIG. 2C, and FIG. 2D depict partitioning of components and functions within several environments.

For example, when performing snapshotting, data is written in block form to storage devices, and ongoing operations of the object being snapshotted can cause the object to become fragmented (e.g., due to block deletions, block additions, etc.). In the absence of some technique to defragment, then at some moment in time the fragmentation can introduce unwanted latency. As some other examples illustrate, ongoing block deletions to an object and/or block overwrites captured in a snapshot series can render a deleted or overwritten block as useless. Such useless blocks can be returned to a free block list (e.g., under some garbage collection regime). The partitioning shown in FIG. 2A is merely one example of such a partitioning.

Figure 2B:
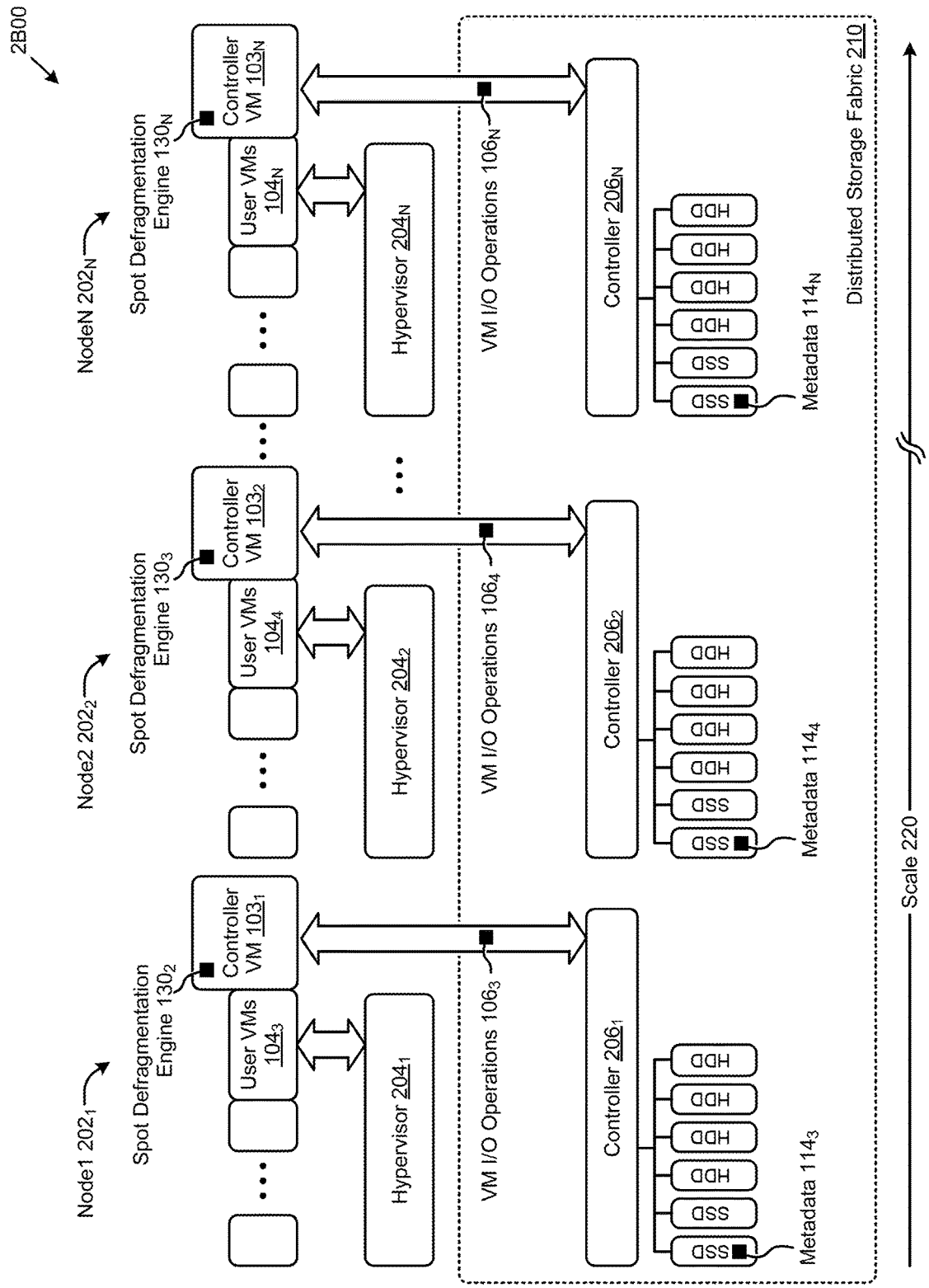

In another partitioning such as is shown in partitioning 2B00 of FIG. 2B, some or all of the function of the I/O controllers can be subsumed into a service virtual machine or controller virtual machine (CVM) such as is depicted by the instances of controller virtual machines (e.g., CVM $103_1$, CVM $103_2$, CVM $103_N$). In such a partitioning, instances of spot defragmentation engines can be implemented within any one or more of the controller virtual machines.

Figure 2C:
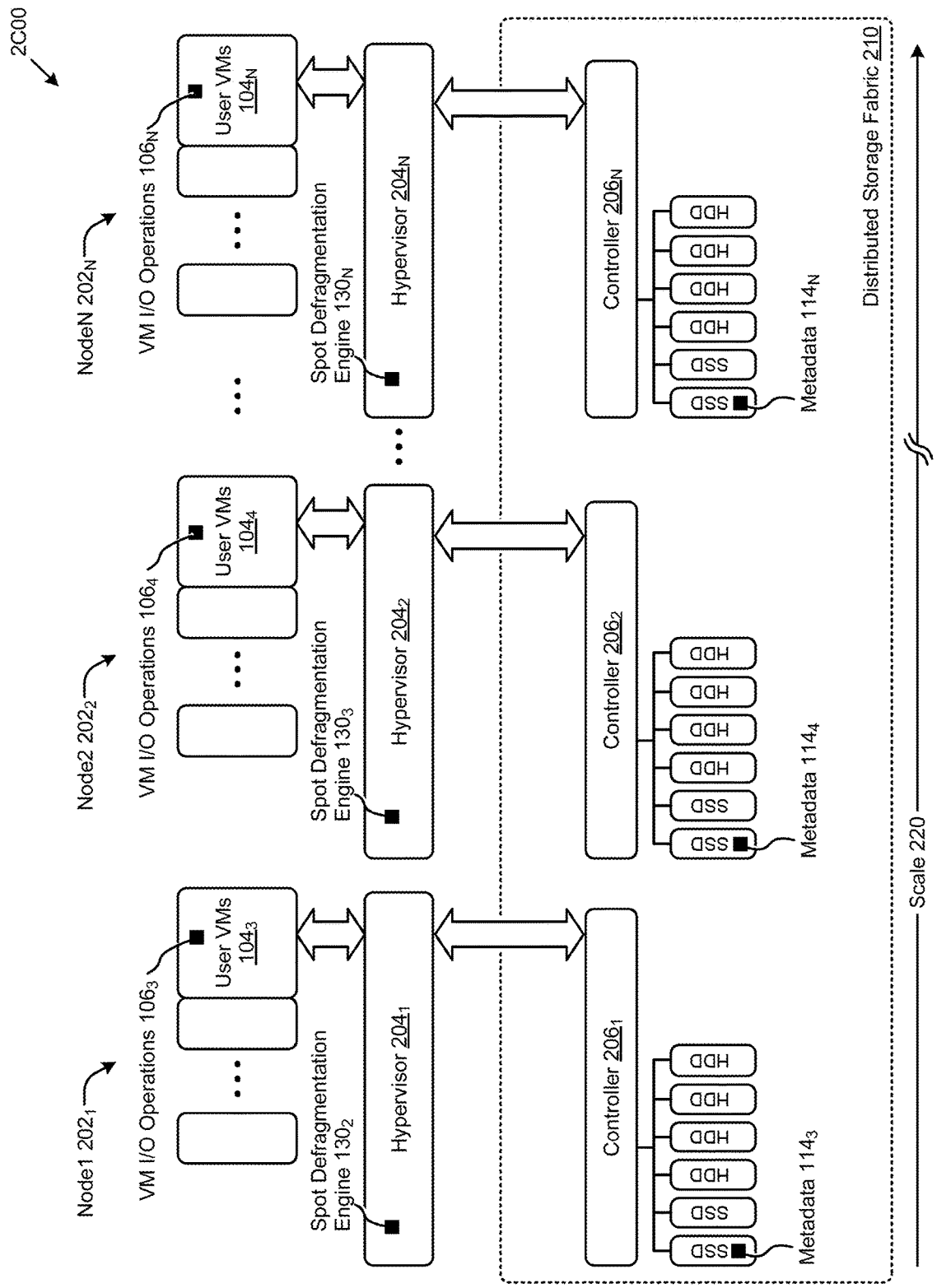

In another partitioning such as is shown in partitioning 2C00 in FIG. 2C, some or all of the function of I/O controllers can be subsumed into hypervisors such as is depicted by the instances of hypervisors (e.g., hypervisor $204_1$, hypervisor $204_2$, hypervisor $204_N$). In such a partitioning, instances of spot defragmentation engines can be implemented within any one or more of the hypervisors.

Figure 2D:
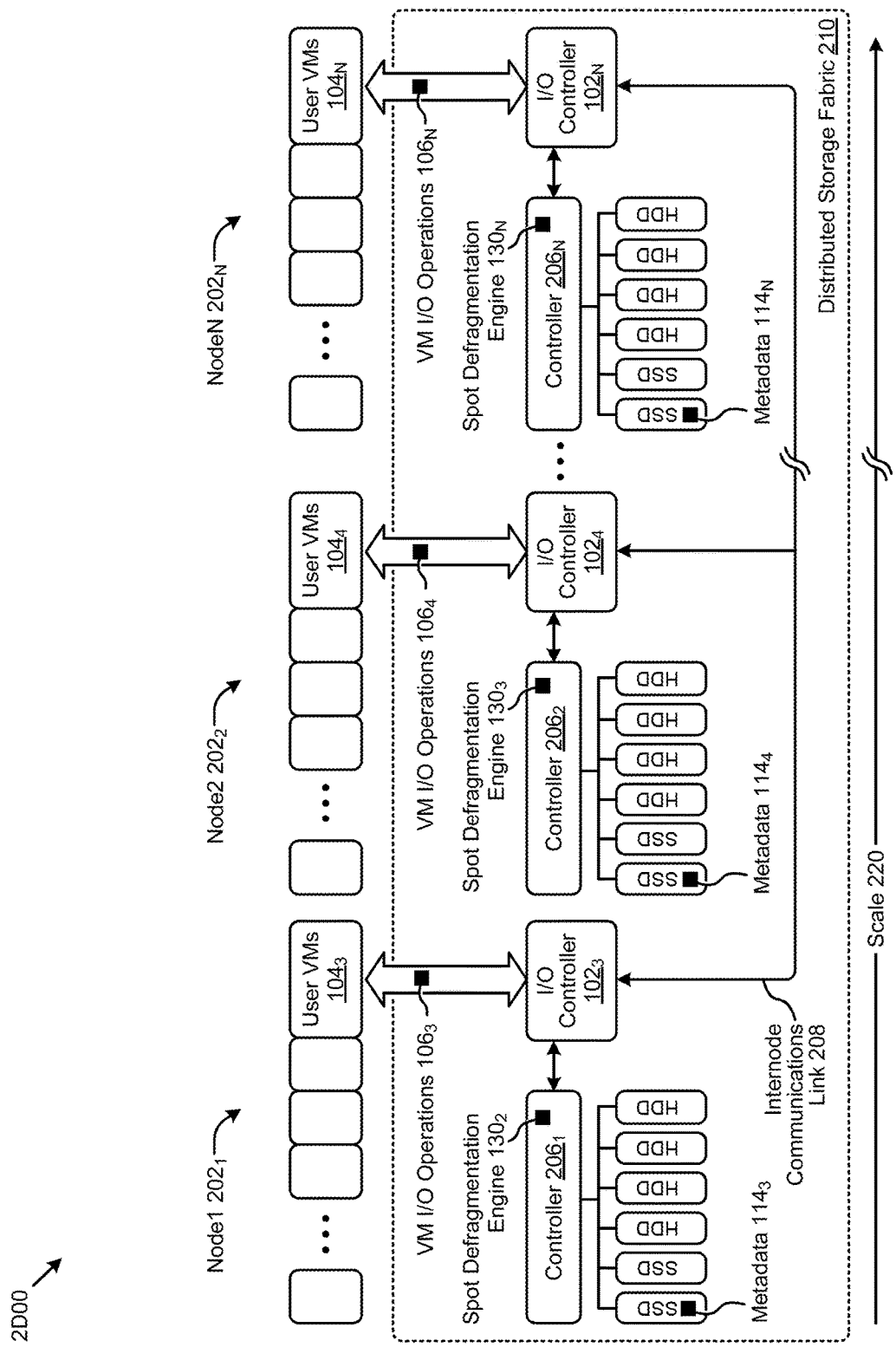

In yet another partitioning such as is shown in partitioning 2D00 in FIG. 2D, some or all of the function of I/O controllers can be subsumed into device controllers. In such a partitioning, instances of spot defragmentation engines can be implemented within any one or more of the device controllers. Strictly as one example, a hard disk drive controller or a solid state drive controller can include metadata (as shown), and a device controller can perform I/O operations, including initiating defragmentation operations over one or more portions of the fragmented physical data blocks. Moreover, it is possible that a device controller can initiate defragmentation operations concurrently with initiating a particular storage I/O command, and further that at least one of the initiated defragmentation operations can finish before completing the particular storage I/O command.

Distribution of Data in Cluster Embodiments

Any combinations of the foregoing nodes (e.g., node1 $202_1$, node2 $202_2$, ..., nodeN $202_N$), whether a homogeneous combination or a heterogeneous combination, can be interconnected so as to form a cluster. In some use cases, the distributed storage fabric 210 can be configured to react to various workloads and/or to allow workload balancing across heterogeneous node configurations and/or heterogeneous node capabilities (e.g., covering compute-heavy workloads, storage-heavy workloads, etc.). For example, ensuring near uniform distribution of data across a cluster can be important when mixing nodes with larger storage capacities. In some cases, such disk balancing can be implemented as a scheduled process invoked as a consequence of a local storage capacity utilization metric having exceeded a certain threshold (e.g., 85% utilization). When an imbalance is identified, certain data blocks can be designated for moving and associated storage I/O operations (e.g., data move operations) and can be distributed to nodes in the cluster (e.g., using the internode communications link 208 such as is shown in FIG. 2A and FIG. 2D). For example, certain user VMs might be running on a node that is writing more data than other nodes, resulting in a skew in the storage capacity utilization for that node. In such cases, the disk balancing process can move the coldest data on the high usage node to other lower usage nodes in the cluster. In other cases, balancing within a node can occur. For example, data might be moved from an SSD device that is nearly fully utilized (e.g., 95%) to a lower tier local HDD device. In such cases, the data identified for migration can be based on the time of the last access (e.g., move colder data before hotter data).

The foregoing disk balancing operations can produce fragmentation. Specifically, logically contiguous data associated with a given logical file and/or vDisk accessed by one or more user VMs can become fragmented across multiple physical storage locations (e.g., across multiple nodes). Such fragmentation can degrade storage I/O latency performance.

Figure 3:
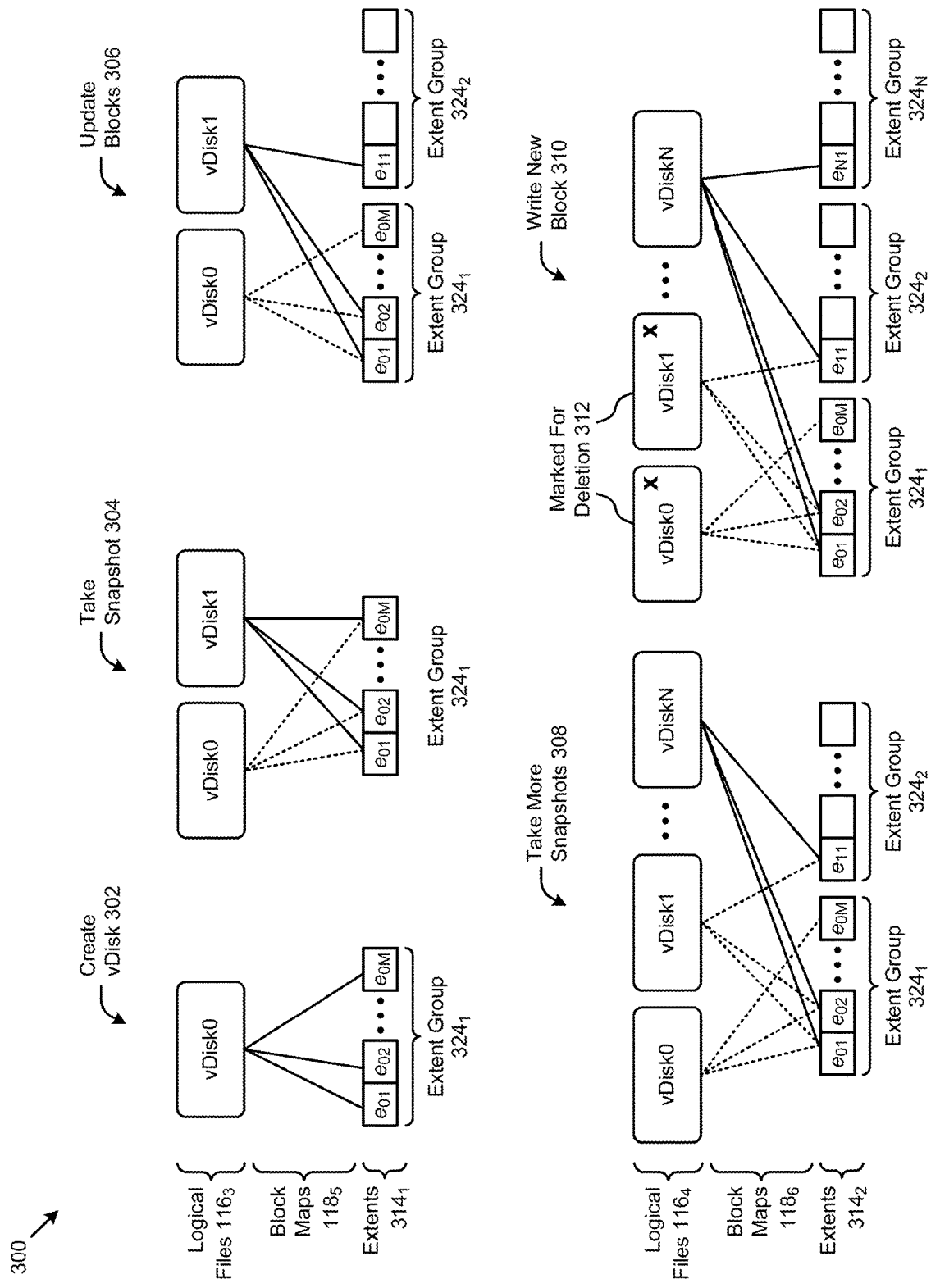
FIG. 3 depicts a data snapshot technique illustrating the need for spot defragmentation of stored data by operations that are concurrent with storage operations, according to an embodiment.

The problems attendant to fragmentation of data in distributed storage environments such as described herein are exacerbated by a technique called snapshotting, as shown and discussed as pertaining to FIG. 3.

FIG. 3 depicts a data snapshot technique 300 illustrating the need for spot defragmentation of stored data by operations that are concurrent with storage operations. As an option, one or more variations of data snapshot technique 300 or any aspect thereof may be implemented in the context of the architecture and functionality of the embodiments described herein. Also, the data snapshot technique 300 or any aspect thereof may be implemented in any environment.

Snapshots of certain data (e.g., files) are used in storage systems to provide a point-in-time representation of data that can be accessed for various purposes, such as recovery from a snapshotted file. The data snapshot technique 300 represents an example sequence of snapshotting states implemented in a distributed computing and storage system. Data in such systems, including snapshot data, can be organized for access by users in logical files (e.g., see logical files $116_3$ and logical files $116_4$). Such logical files can be hosted as, and/or referred to as, virtual disks or vDisks (e.g., vDisk0, vDisk1, ..., vDiskN). A logical file created for the purposes of snapshotting can be referred to as a snapshot logical file. The logical files comprise one or more extents (e.g., see extents $314_1$ and extents $314_2$) that can be grouped and stored in extent groups (e.g., extent group $324_k$, extent group $324_2$, ..., extent group $324_N$). The extents can be logically contiguous data (e.g., 1 MB) comprising one or more blocks (e.g., 4 kB, 1 kB, 512B, etc.). The extents can be accessed (e.g., read, write, update, etc.) on a sub-extent basis (e.g., per sector, per block, per slice, etc.) for efficiency. Further, the extent groups comprise physically contiguous stored data (e.g., 4 MB, 1 MB, etc.). The foregoing extents can be dynamically distributed among the extent groups according to certain performance targets (e.g., disk balancing) as earlier described. The mapping of the logical representations of the data (e.g., vDisks, extents, etc.) to the physical representations of the data (e.g., extent groups) is contained in various instances of block maps (e.g., see block maps $118_5$ and block maps $118_6$).

As shown in FIG. 3, an initial vDisk (e.g., vDisk0) might be initially created to comprise various extents (e.g., $e_{01}$, $e_{02}$, ..., $e_{0M}$) stored in extent group $324_1$ (see create vDisk state 302). At a later time, a snapshot of vDisk0 can be taken (see take snapshot state 304). As shown, the snapshot can mark vDisk0 as immutable and create a new vDisk1 that is available for modification. In this case, no physical data is moved and/or copied. Instead, new metadata (e.g., a block map for vDisk1) is generated. At some later time, a block (e.g., 4 kB) in extent $e_{0M}$ might be updated (see update blocks state 306). Since extent $e_{0M}$ in extent group $324_1$ is associated with vDisk0 which is marked immutable, the update creates a new extent $e_{11}$ stored in extent group $324_2$. As illustrated in the shown example, the logically associated extents $e_{01}$, $e_{02}$, and $e_{11}$ are now physically fragmented among multiple extent groups. More snapshots might then be taken over time, resulting in more vDisks being marked immutable and/or more vDisks (and block maps) being created (see take more snapshots state 308). Specifically, a vDiskN is shown mapped to extents $e_{01}$, $e_{02}$, and $e_{11}$. With vDiskN now the actively accessed logical file, writing a new block might create the extent $e_{N1}$ in extent group $324_N$ (see write new block state 310).

In some cases, the foregoing operations of snapshotting and/or data modification can be iterated multiple times, potentially resulting in a high degree of fragmentation. For example, since data can be modified at the block (e.g., 4 kB) level, reading a 16 kB region (e.g., four blocks) from a given vDisk might require reading up to 4 MB (e.g., four extents) from different physical locations (e.g., four extent groups), resulting in degraded access latency performance. Further, a retention policy might be implemented to determine the number of snapshots to retain. For example, snapshots older than a certain period of time (e.g., 1 hour, 1 day, etc.) might be marked for deletion and/or designated as having an "expired" state to allow extents and/or extent groups held immutable by the snapshots to be availed to the distributed storage system. For example, vDisk0 and vDisk1 are shown to be marked for deletion (see message 312). Unfortunately, while extent $e_{0M}$ is associated only with the expired vDisk0, extent $e_{01}$ and extent $e_{02}$ remain associated with a logical file (e.g., vDiskN) that is in an "active" state. In such a case, the extents and/or extent groups associated with the expired snapshot marked for deletion cannot be reclaimed for use by the distributed storage system, resulting in degraded storage capacity utilization.

The foregoing problems attendant to fragmented data and/or snapshotting in a highly active storage I/O distributed storage environment is addressed by the disclosed techniques for spot defragmentation of stored data by operations that are concurrent with storage operations as described herein.

Figure 4A:
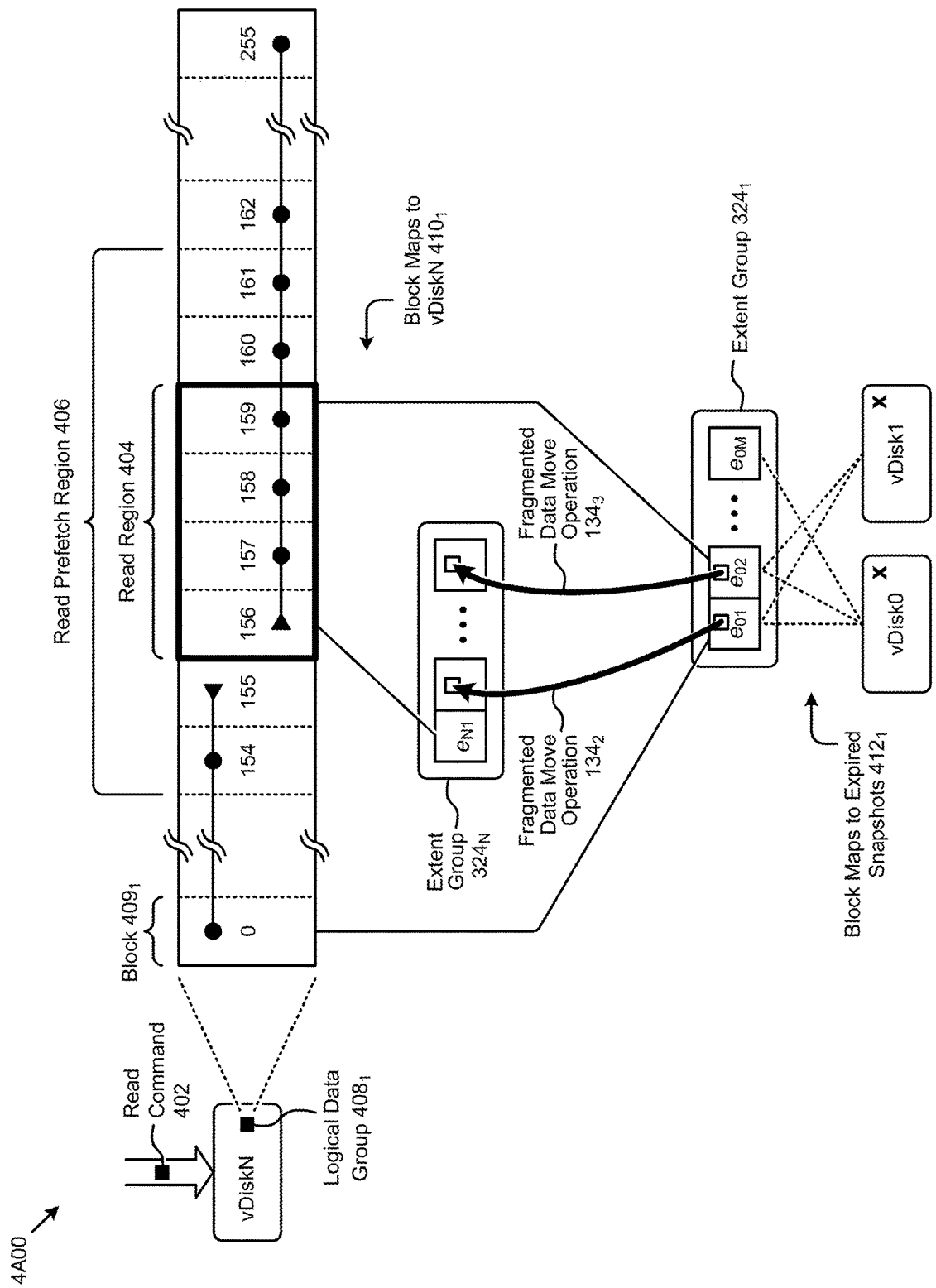
FIG. 4A depicts a read-responsive fragmented data identification technique as implemented by systems for spot defragmentation of stored data by operations that are overlapping or concurrent with storage operations, according to some embodiments.

FIG. 4A depicts a read-responsive fragmented data identification technique 4A00 as implemented in systems for spot defragmentation of stored data by operations that are overlapping or concurrent with storage operations. As an option, one or more variations of read-responsive fragmented data identification technique 4A00 or any aspect thereof may be implemented in the context of the architecture and functionality of the embodiments described herein. Also, the read-responsive fragmented data identification technique 4A00 or any aspect thereof may be implemented in any environment.

The read-responsive fragmented data identification technique 4A00 can be used in systems implementing spot defragmentation of stored data by operations that are concurrent with storage operations. Specifically, the read-responsive fragmented data identification technique 4A00 depicts defragmentation operations concurrent with a read command 402 associated with a certain region (e.g., "spot") of the vDiskN described in FIG. 3. As shown, the read command 402 can address a read region 404 in a logical data group $408_1$ comprising one or more blocks (e.g., block $409_1$). For example, the logical data group $408_1$ might be 1 MB and comprise 256 4 kB blocks (e.g., blocks 0-255). In this case, the read region 404 might be 16 kB.

When the read command 402 is issued (e.g., from an I/O controller), a set of metadata associated with the logical data group $408_1$ comprising the read region 404 will be fetched to service the storage I/O operation. The fetched metadata can include information characterizing a set of block maps to vDiskN $410_1$ and/or information characterizing a set of block maps to expired snapshots $412_1$. The read-responsive fragmented data identification technique 4A00 can invoke a set of operations that progress concurrently with the read command 402 and that use the metadata and/or information (e.g., indexes, addresses, etc.) associated with read command 402 to determine one or more starting points for scanning the logical data group $408_1$ for the existence of fragmented data. For example, and as shown, a first portion of the scan might commence at block 156 within the read region 404, traversing through the read region 404 (e.g., blocks 156-159) and higher order blocks (e.g., blocks 160-255) until reaching a boundary of the logical data group $408_1$. A second portion of the scan might further commence at block 155 adjacent to the read region 404, traversing through lower order blocks until reaching a boundary of the logical data group $408_1$.

At each block encountered during the scan, the metadata can be analyzed to determine if the block is mapped to data that is fragmented. In some cases, a fragmentation determination can be based on the physical location mapped to the subject block as compared to a reference physical location, such as the most recently accessed extent group associated with the subject logical data group $408_1$. Representative mapping examples of certain blocks comprising the logical data group $408_1$ are shown in FIG. 4A. Specifically, the metadata (e.g., block maps to vDiskN $410_1$) corresponding to block 156 indicates that block 156 is mapped to extent $e_{N1}$ in extent group $324_N$. The metadata might further indicate that extent group $324_N$ is also the most recently accessed extent group (e.g., for writing new data to block 156) associated with the logical data group $408_1$. In this case, no further action might be taken for block 156.

In other cases, further action might be invoked for a given block. Specifically, and as shown, the metadata (e.g., block maps to vDiskN $410_1$) can indicate that block 0 and block 159 are mapped to extent $e_{01}$ and extent $e_{02}$, respectively, in extent group $324_1$. The metadata (e.g., block maps to expired snapshots $412_1$) might further indicate that other references to extent $e_{01}$ and extent $e_{02}$ are limited to only expired snapshots (e.g., vDisk0 and vDisk1). In this case, the data associated with the blocks mapped to extent $e_{01}$ and extent $e_{02}$ can be identified as fragmented data and candidates for coalescing. As shown, such candidates can be moved to extent group $324_N$ (e.g., see fragmented data move operation $134_2$ and fragmented data move operation $134_3$). In some cases, the fragmented data identified for coalescing (e.g., data mapped to block 159) might be included in a read prefetch region 406 associated with the read command 402 such that the fragmented data can be available in cache memory for low latency access when executing the move to the target location (e.g., extent group $324_N$). In other cases, the fragmented data identified for coalescing (e.g., data mapped to block 0) might be copied from its current location to facilitate the move to the target location (e.g., extent group $324_N$).

The read-responsive fragmented data identification technique 4A00 can improve data access latency in storage systems (e.g., highly active storage I/O distributed storage environments, single storage devices, etc.) by coalescing logically associated data in a minimal number of physical locations. The read-responsive fragmented data identification technique 4A00 can further improve storage capacity utilization in storage systems implementing snapshotting or related techniques (e.g., cloning) by enabling the storage capacity used by the fragmented data to be reclaimed by the system. One embodiment of a technique for providing such benefits concurrent with write commands is described in FIG. 4B.

Figure 4B:
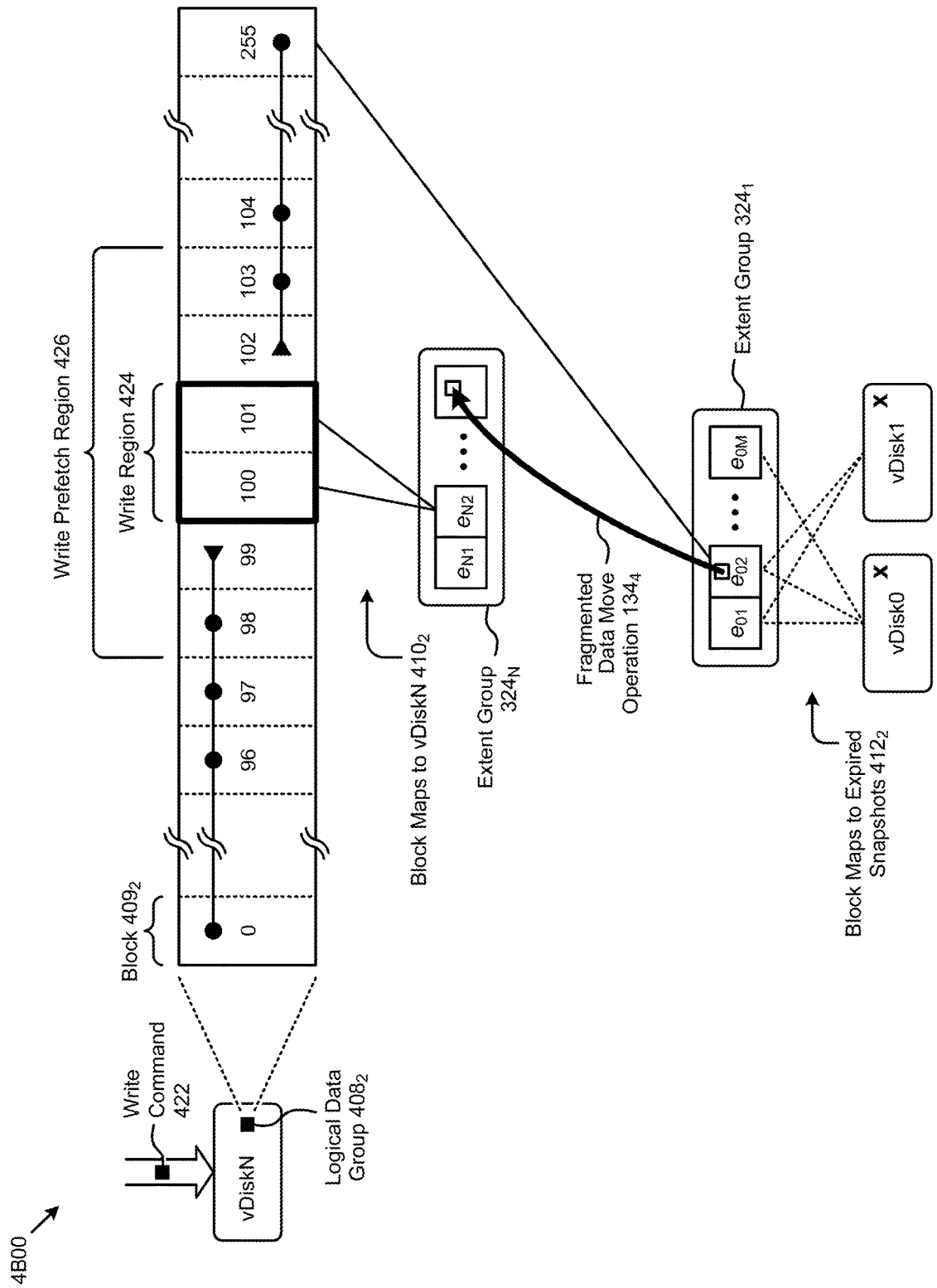
FIG. 4B depicts a write-responsive fragmented data identification technique as implemented by systems for spot defragmentation of stored data by operations that are overlapping or concurrent with storage operations, according to some embodiments.

FIG. 4B depicts a write-responsive fragmented data identification technique 4B00 as implemented in systems for spot defragmentation of stored data by operations that are overlapping or concurrent with storage operations. As an option, one or more variations of write-responsive fragmented data identification technique 4B00 or any aspect thereof may be implemented in the context of the architecture and functionality of the embodiments described herein.

Also, the write-responsive fragmented data identification technique 4B00 or any aspect thereof may be implemented in any environment.

The write-responsive fragmented data identification technique 4B00 can be used in systems implementing spot defragmentation of stored data by operations that are concurrent with storage operations. Specifically, the write-responsive fragmented data identification technique 4B00 depicts defragmentation operations concurrent with a write command 422 associated with a certain region (e.g., a "spot") of the vDiskN described in FIG. 3. As shown, the write command 422 can address a write region 424 in a logical data group $408_2$ comprising one or more blocks (e.g., block $409_2$). For example, the logical data group $408_2$ might be 1 MB and comprise 256 4 kB blocks (e.g., blocks 0-255). In this case, the write region 424 might be 8 kB.

When the write command 422 is issued (e.g., from an I/O controller), a set of metadata associated with the logical data group $408_2$ comprising the write region 424 will be fetched to service the storage I/O operation. The fetched metadata can include information characterizing a set of block maps to vDiskN $410_2$ and/or information characterizing a set of block maps to expired snapshots $412_2$. The write-responsive fragmented data identification technique 4B00 can invoke a set of operations concurrent with the write command 422 that use the metadata and/or information (e.g., indexes, addresses, payload, etc.) associated with the write command 422 to determine one or more starting points for scanning the logical data group $408_2$ for fragmented data. For example, and as shown, a first portion of the scan might commence at block 102 adjacent to the write region 424, traversing through the higher order blocks (e.g., blocks 102, 103, 104, . . . 255) until reaching a boundary of the logical data group $408_2$. A second portion of the scan might further commence at block 99 adjacent to the write region 424, traversing through lower order blocks (e.g., blocks 0-99) until reaching a boundary of the logical data group $408_2$. The blocks comprising the write region 424 are not scanned since, as shown, the write blocks are already contiguous.

At each block encountered during the scan, the metadata can be analyzed to determine if the block is mapped to data that is fragmented. In some cases, a fragmentation determination can be based on the physical location mapped to the subject block as compared to a reference physical location, such as a cached extent group associated with the subject logical data group $408_2$. Representative mapping examples of certain blocks comprising the logical data group $408_2$ are shown in FIG. 4B. Specifically, the metadata (e.g., block maps to vDiskN $410_2$) corresponding to block 100 and block 101 in the write region 424 indicates that block 100 and block 101 are mapped to a newly created extent $e_{N2}$ in extent group $324_N$ as a result of the execution of the write command 422. The access to extent $e_{N2}$ in extent group $324_N$ by the write command 422 might further indicate that extent group $324_N$ is also the most recently accessed extent group associated with the logical data group $408_2$.

As the remaining blocks in the logical data group $408_2$ are scanned for fragmentation according to the write-responsive fragmented data identification technique 4B00, certain actions might be invoked for a given block. Specifically, and as shown, the metadata (e.g., block maps to vDiskN $410_2$) can indicate that block 255 is mapped to extent $e_{02}$ in extent group $324_1$. The metadata (e.g., block maps to expired snapshots $412_2$) might further indicate that other referenced extents are limited to only expired snapshots (e.g., vDisk0 and vDisk1). In this case, the data associated with block 255 mapped to extent $e_{02}$ can be identified as fragmented data and a candidate for coalescing. As shown, the identified candidate can be moved to the extent group $324_N$ (e.g., see fragmented data move operation $134_4$). In some cases, the fragmented data identified for coalescing might be included in a write prefetch region 426 associated with the write command 422 such that the fragmented data might be available in cache memory (e.g., accessible with low latency) for access when executing the move operation (e.g., when executing the I/O pertaining to movement of the fragmented data to the target location). In other cases, the fragmented data identified for coalescing (e.g., data mapped to block 255) might be copied from its current location (e.g., in an older snapshot) to a newer, or newest snapshot.

The write-responsive fragmented data identification technique 4B00 can improve data access latency in storage systems (e.g., highly active storage I/O distributed storage environments, single storage device, etc.) by coalescing logically associated data into a minimal number of physical locations. The write-responsive fragmented data identification technique 4B00 can further improve storage capacity utilization in storage systems implementing snapshotting or related techniques (e.g., cloning) by enabling the storage capacity used by the fragmented data to be reclaimed by the system.

In one or more embodiments, the foregoing fragmented data identification techniques and/or other herein disclosed techniques can be implemented on an instance of a spot defragmentation engine operating on an instance of an I/O controller in a distributed storage and compute platform. Such an implementation is purely exemplary, and other systems, subsystems, and/or partitionings for implementing the herein disclosed techniques are possible. A technique for spot defragmentation of stored data by operations that are concurrent with storage operations implemented in such systems, subsystems, and partitionings is shown in FIG. 5.

Figure 5:
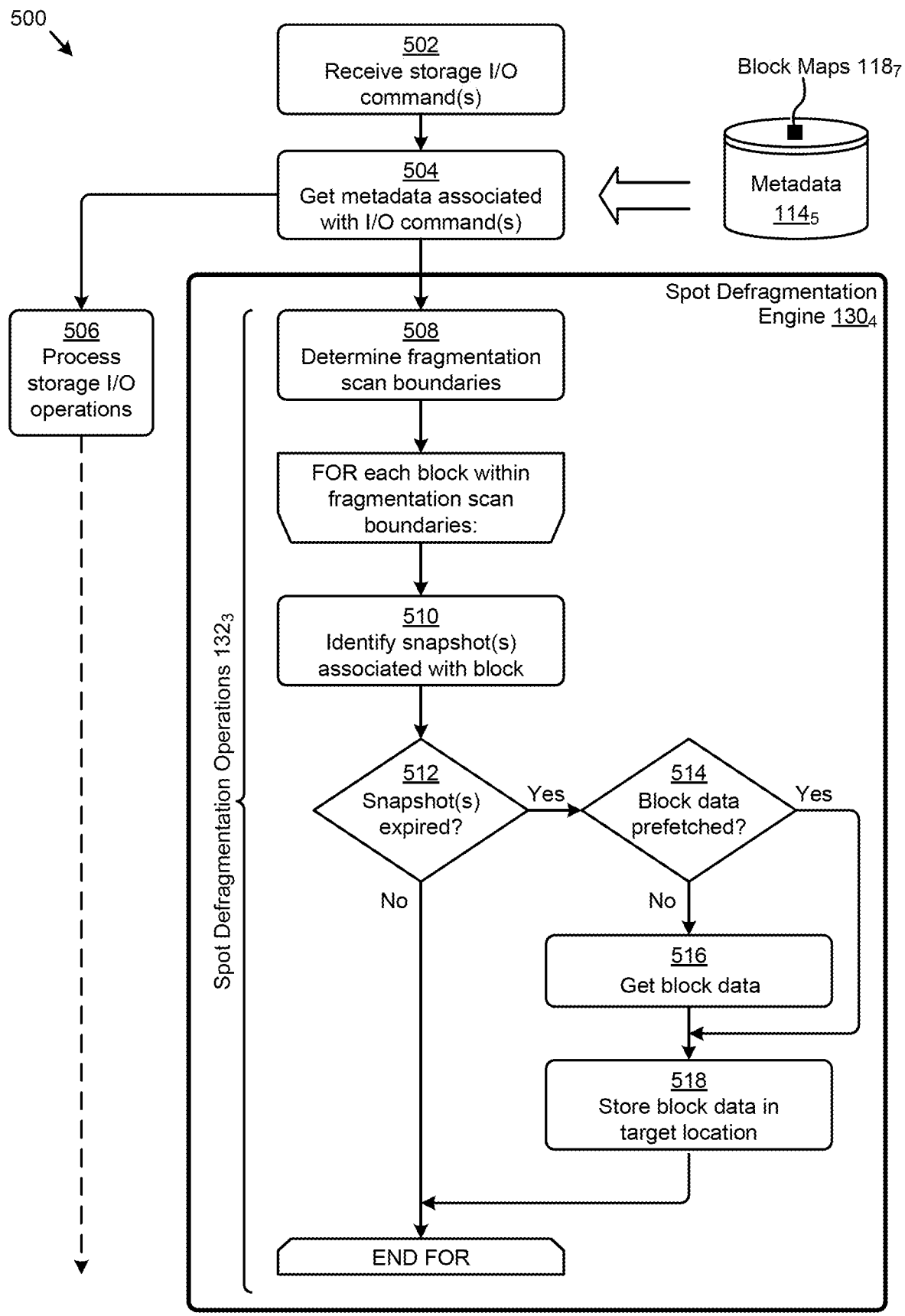
FIG. 5 illustrates a spot defragmentation technique as used in systems for spot defragmentation of stored data by operations that are overlapping or concurrent with storage operations, according to some embodiments.

FIG. 5 illustrates a spot defragmentation technique 500 as used in systems for spot defragmentation of stored data by operations that are overlapping or concurrent with storage operations. As an option, one or more variations of spot defragmentation technique 500 or any aspect thereof may be implemented in the context of the architecture and functionality of the embodiments described herein. Also, the spot defragmentation technique 500 or any aspect thereof may be implemented in any environment.

The shown spot defragmentation technique 500 presents one embodiment of certain steps and/or operations for implementing spot defragmentation of stored data by operations that are concurrent with storage I/O operations. In one or more embodiments, the steps and underlying operations comprising the spot defragmentation operations $132_3$ shown in FIG. 5 can be executed by an instance of the spot defragmentation engine $130_4$. As shown, the spot defragmentation technique 500 can commence with receiving storage I/O commands, for example, at an instance of an I/O controller that includes the spot defragmentation engine $130_4$ (see operation 502). Metadata associated with the received storage I/O commands (e.g., block maps $118_7$) can be fetched (see operation 504) from one or more metadata storage facilities (e.g., metadata $114_5$). The fetched metadata and/or information (e.g., indexes, addresses, payload, etc.) associated with the received storage I/O commands can be used to process the storage I/O commands (see operation 506). The fetched metadata and/or information (e.g., indexes, addresses, payload, etc.) associated with the received storage I/O commands can further be used to process the spot defragmentation operations $132_3$.

The spot defragmentation operations 132₃ can commence execution before, during, or after the storage I/O commands have commenced execution. Further, the spot defragmentation operations 132₃ can complete execution before, during, or after the storage I/O commands have completed execution. Such concurrent execution of the spot defragmentation operations 132₃ and the storage I/O commands according to the herein disclosed techniques can reduce the resources required for defragmentation by using the metadata that has already been fetched for the storage I/O commands to execute the spot defragmentation operations 132₃. Further, concurrent execution of the spot defragmentation operations 132₃ and the storage I/O commands can serve to limit the extent of data fragmentation as a spot defragmentation check is performed at each I/O command, which can be a primary source of fragmentation.

As shown, the spot defragmentation operations 132₃ might commence by determining fragmentation scan boundaries associated with the region specified by the storage I/O commands (see operation 508). For example, a storage I/O command might access a 16 kB region of data (e.g., four 4 kB blocks) in a 1 MB logical data group (e.g., 256 4 kB blocks) such that the metadata for the 1 MB logical data group is fetched. In this case, the fragmentation scan boundaries might span the full 1 MB logical data group (e.g., all 256 blocks) since the metadata is available.

In some cases, the scan boundaries can be dynamic based on various metrics. For example, a scan boundary might be adjusted during execution of the spot defragmentation operations 132₃ based on a predicted time, nominally-expected time, or a measured time to execute the remaining operations (e.g., scan N more blocks). As another example, a scan boundary might be based on computing resource availability, storage capacity utilization, and/or other metrics. When the fragmentation scan boundaries have been determined, certain steps and/or operations can be executed for each block to identify and coalesce fragmented data associated with the blocks. Specifically, for each block within the fragmented scan boundaries, the one or more snapshots associated with the block can be identified (see operation 510). For example, the mapping of a block to various snapshots can be determined from the block maps 118₇. If the identified snapshots are all expired (e.g., marked for deletion), the block data is a candidate for coalescing (see "Yes" path of decision 512). If any of the identified snapshots for the block are not expired, the block data is not a candidate for coalescing (see "No" path of decision 512) and a next block (if available) is selected.

Block data determined to be a candidate for coalescing or defragmentation can be moved from a current physical location to another target physical location that has been determined to facilitate a reduction in fragmentation effects (e.g., increased access latencies). For example, fragmented data might be moved to the one or more extent groups that have recently been accessed (e.g., no extents mapped to expired snapshots). Such movement of fragmented data (e.g., defragmentation candidates) might commence with determining whether the candidate block data has been prefetched (see decision 514). For example, one or more of the received storage I/O commands (see operation 502) and/or an earlier received storage I/O command might have invoked certain data to be prefetched and stored in cache memory for reduced latency access. If the defragmentation candidate block data has not been prefetched (see "No" path of decision 514), the block data can be read from its current location to facilitate the earlier described move of fragmented data (see operation 516). The block data read from cache memory and/or its current location can then be stored in the target location (see operation 518). A next block can then be selected for processing until all blocks within the fragmentation scan boundaries have been processed.

Additional Embodiments of the Disclosure

Additional Practical Application Examples

Figure 6A:
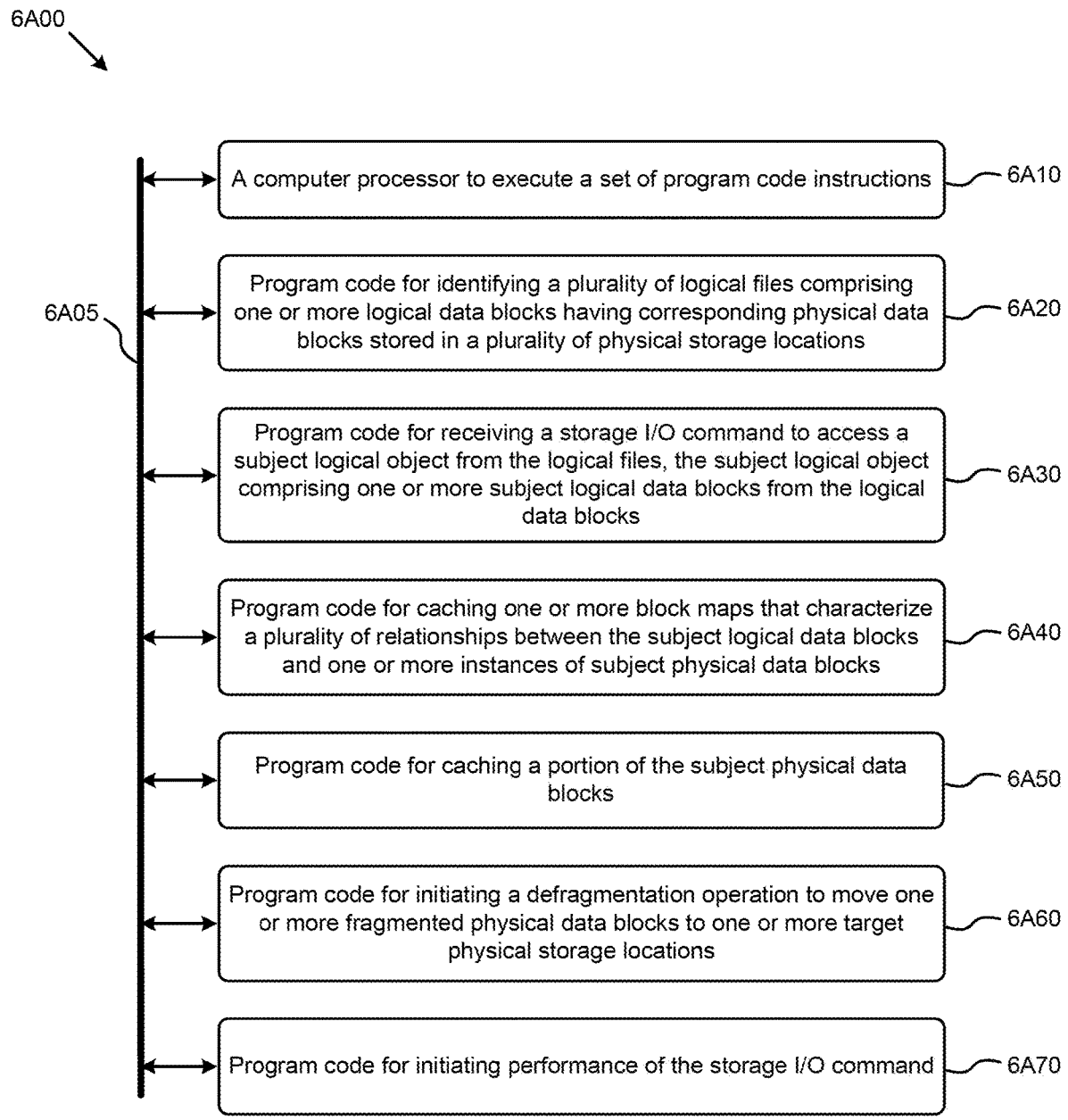
FIG. 6A, FIG. 6B, and FIG. 6C depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible.

The modules include a processor (see module 6A10) as well as other modules that interoperate over bus 6A05 to perform the following acts: identifying a plurality of logical files comprising one or more logical data blocks having corresponding physical data blocks stored in a plurality of physical storage locations (see module 6A20); receiving a storage I/O command to access a subject logical object from the logical files, the subject logical object comprising one or more subject logical data blocks from the logical data blocks (see module 6A30); caching one or more block maps that characterize a plurality of relationships between the subject logical data blocks and one or more instances of subject physical data blocks (see module 6A40); caching a portion of the subject physical data blocks (see module 6A50); initiating a defragmentation operation to move one or more fragmented physical data blocks to one or more target physical storage locations (see module 6A60); and initiating performance of the storage I/O command (see module 6A70).

The defragmentation operation can finish before the storage I/O operation, or the defragmentation operation can finish after the storage I/O operation.

Figure 6B:
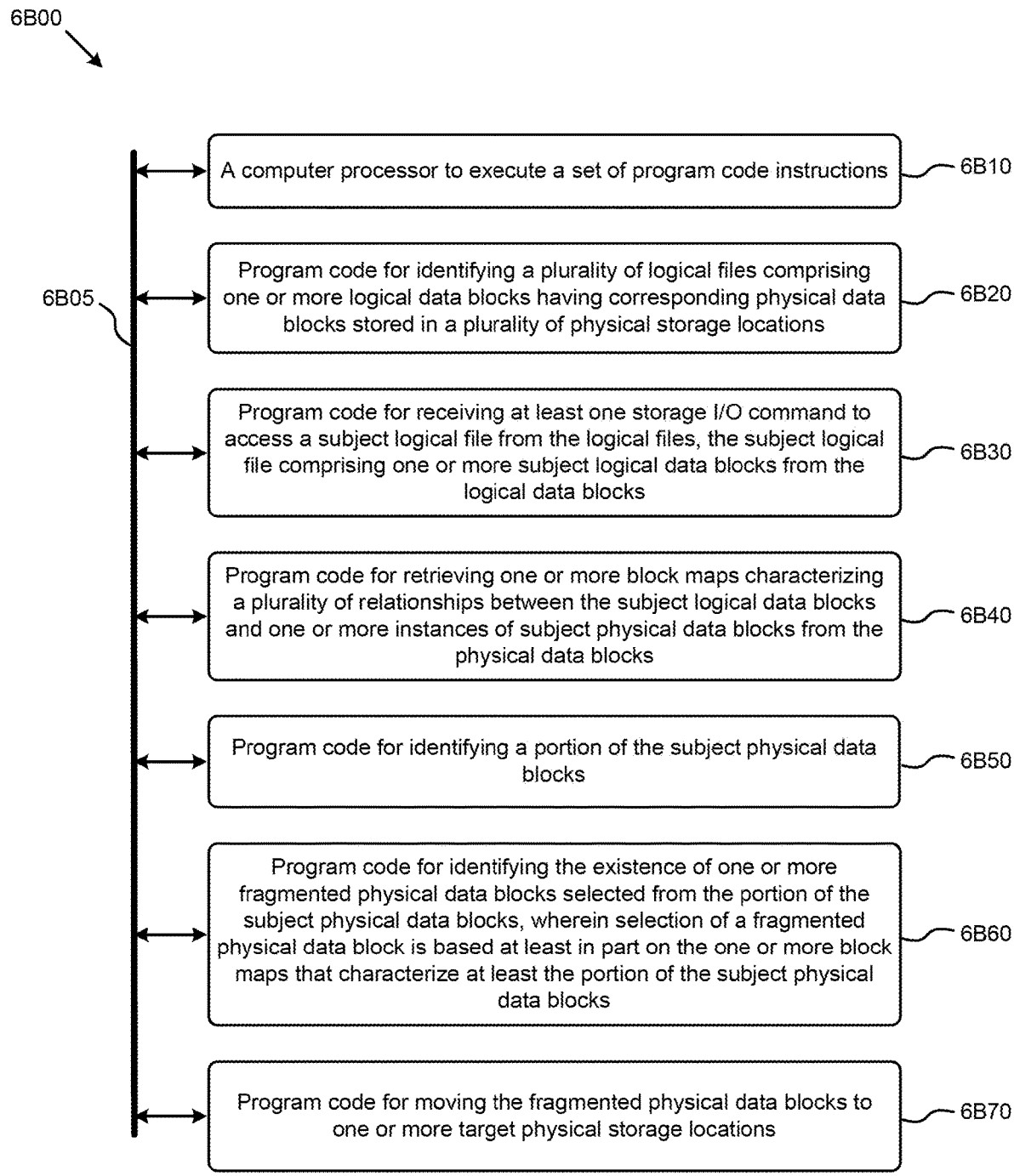

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the present system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising a computer processor to execute a set of program code instructions (see module 6B10) and modules for accessing memory to hold program code instructions to perform: identifying a plurality of logical files comprising one or more logical data blocks having corresponding physical data blocks stored in a plurality of physical storage locations (see module 6B20); receiving at least one storage I/O command to access a subject logical file from the logical files, the subject logical file comprising one or more subject logical data blocks from the logical data blocks (see module 6B30); retrieving one or more block maps characterizing a plurality of relationships between the subject logical data blocks and one or more instances of subject physical data blocks from the physical data blocks (see module 6B40); identifying a portion of the subject physical data blocks (see module 6B50); identifying the existence of one or more fragmented physical data blocks selected from the portion of the subject physical data blocks, wherein selection of a fragmented physical data block is based at least in part on the one or more block maps that characterize at least the portion of the subject physical data blocks (see module 6B60); and moving the fragmented physical data blocks to one or more target physical storage locations (see module 6B70).

Embodiments of the foregoing system can have many variations. Strictly as examples, the system can include:

- Embodiments where the block maps further characterize one or more associations between the subject physical data blocks and one or more snapshot logical files;
- Embodiments where identifying a set of fragmented physical data blocks is based at least in part on a state of the snapshot logical files;
- Embodiments where the state is at least one of, expired, or active;
- Embodiments where at least one of the fragmented physical data blocks is stored in cache memory;
- Embodiments where the portion of the subject physical data blocks is characterized by one or more determined scan boundaries;
- Embodiments where the determined scan boundaries are based at least in part on one of, a read region, or a write region;
- Embodiments where the determined scan boundaries are based at least in part on one of, a predicted time, or a measured time;
- Embodiments where the physical storage locations correspond to physical storage devices; and/or
- Embodiments where the physical storage device comprises at least one of, a solid state storage device (SSD), or a hard disk drive (HDD).

Figure 6C:
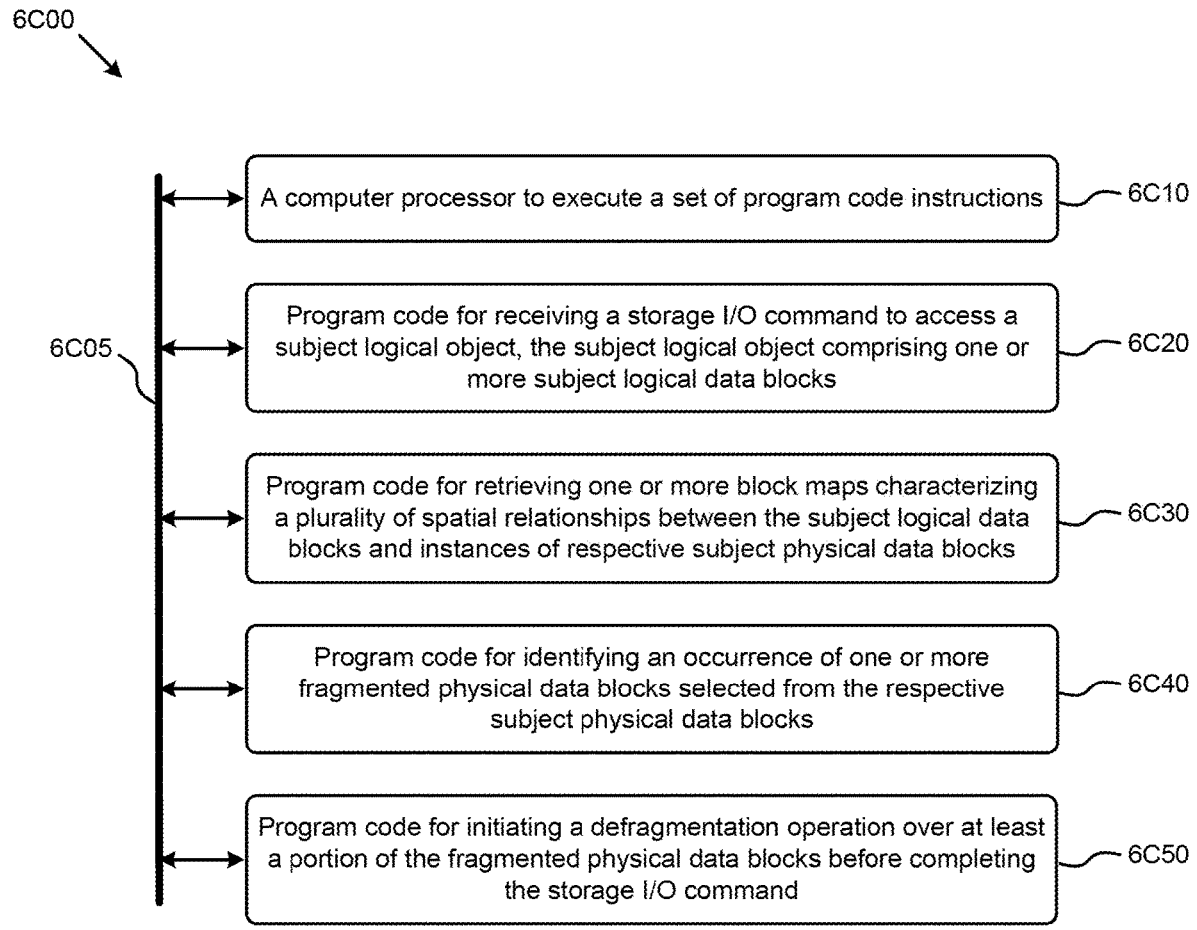

FIG. 6C depicts a system 6C00 as an arrangement of computing modules that are interconnected so as to operate cooperatively to implement certain of the herein-disclosed embodiments. As an option, the system 6C00 may be implemented in the context of the architecture and functionality of the embodiments described herein. Of course, however, the system 6C00 or any operation therein may be carried out in any desired environment.

The system 6C00 comprises at least one processor and at least one memory, the memory serving to store program instructions corresponding to the operations of the system. As shown, an operation can be implemented in whole or in part using program instructions accessible by a module. The modules are connected to a communication path 6C05, and any operation can communicate with other operations over communication path 6C05. The modules of the system can, individually or in combination, perform method operations within system 6C00. Any operations performed within system 6C00 may be performed in any order unless as may be specified in the claims.

The shown embodiment implements a portion of a computer system, presented as system 6C00, comprising a computer processor to execute a set of program code instructions (see module 6C10) and modules for accessing memory to hold program code instructions to perform: receiving a storage I/O command to access a subject logical object, the subject logical object comprising one or more subject logical data blocks (see module 6C20); retrieving one or more block maps characterizing a plurality of spatial relationships between the subject logical data blocks and instances of respective subject physical data blocks (see module 6C30); identifying an occurrence of one or more fragmented physical data blocks selected from the respective subject physical data blocks (see module 6C40); and initiating a defragmentation operation over at least a portion of the fragmented physical data blocks before completing the storage I/O command (see module 6C50).

System Architecture Overview

Additional System Architecture Examples

Figure 7A:
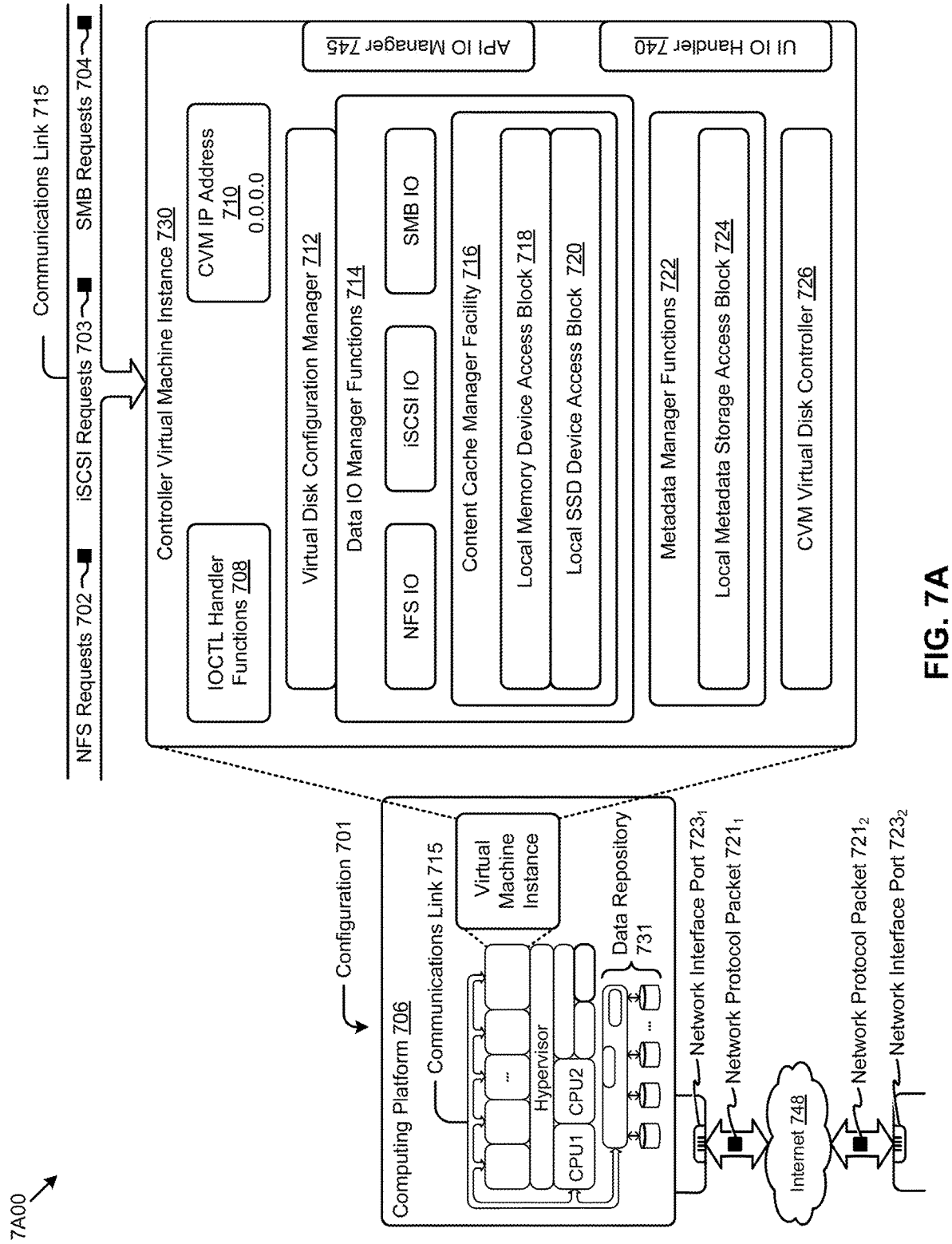
FIG. 7A and FIG. 7B depict architectures comprising collections of interconnected components suitable for implementing embodiments of the present disclosure and/or for use in the herein-described environments.

FIG. 7A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block IO storage requests as of network file system (NFS) requests in the form of NFS requests 702, and/or internet small computer storage interface (iSCSI) block IO requests in the form of iSCSI requests 703, and/or Samba file system requests (SMB) in the form of SMB requests 704. The controller virtual machine instance publishes and responds to an internet protocol (IP) address (e.g., see CVM IP address 710. Various forms of input and output (TO) can be handled by one or more IO control handler IOCTL handler functions 708 that interface to other functions such as data IO manager functions 714, metadata manager functions 722. As shown, the data IO manager functions can include communication with a virtual disk configuration manager 712, and/or can include direct or indirect communication with any of various block IO functions (e.g., NFS TO, iSCSI IO, SMB TO, etc.).

In addition to block IO functions, the configuration 701 supports IO of any form (e.g., block TO, streaming TO, packet-based TO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packetization (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid state storage devices (SSD), or optical or magnetic disks such as disk drives or tape drives. Volatile media includes dynamic memory such as a random access memory. As shown, the controller virtual machine instance 730 includes a content cache manager facility 716 that accesses storage locations, possibly including local DRAM (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731, can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 701 can be coupled by a communications link 715 (e.g., backplane, LAN, PTSN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 723$_1$ and network interface port 723$_2$). The configuration 701 can be addressed through one or more network interface ports using an IP address. Any operational element within computing platform 706 can perform sending and receiving operations using any of a range of network protocols, possibly including network protocols that send and receive packets (e.g., see network protocol packet 721$_1$ and network protocol packet 721$_2$).

The computing platform 706 may transmit and receive messages that can be composed of configuration data, and/or any other forms of data and/or instructions organized into a data structure (e.g., communications packets). In some cases, the data structure includes program code instructions (e.g., application code), communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of performing spot defragmentation of stored data by operations that are concurrent with storage operations.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of spot defragmentation of stored data by operations that run concurrently with storage operations). Such files or records can be brought into and/or stored in volatile or non-volatile memory.

Figure 7B:
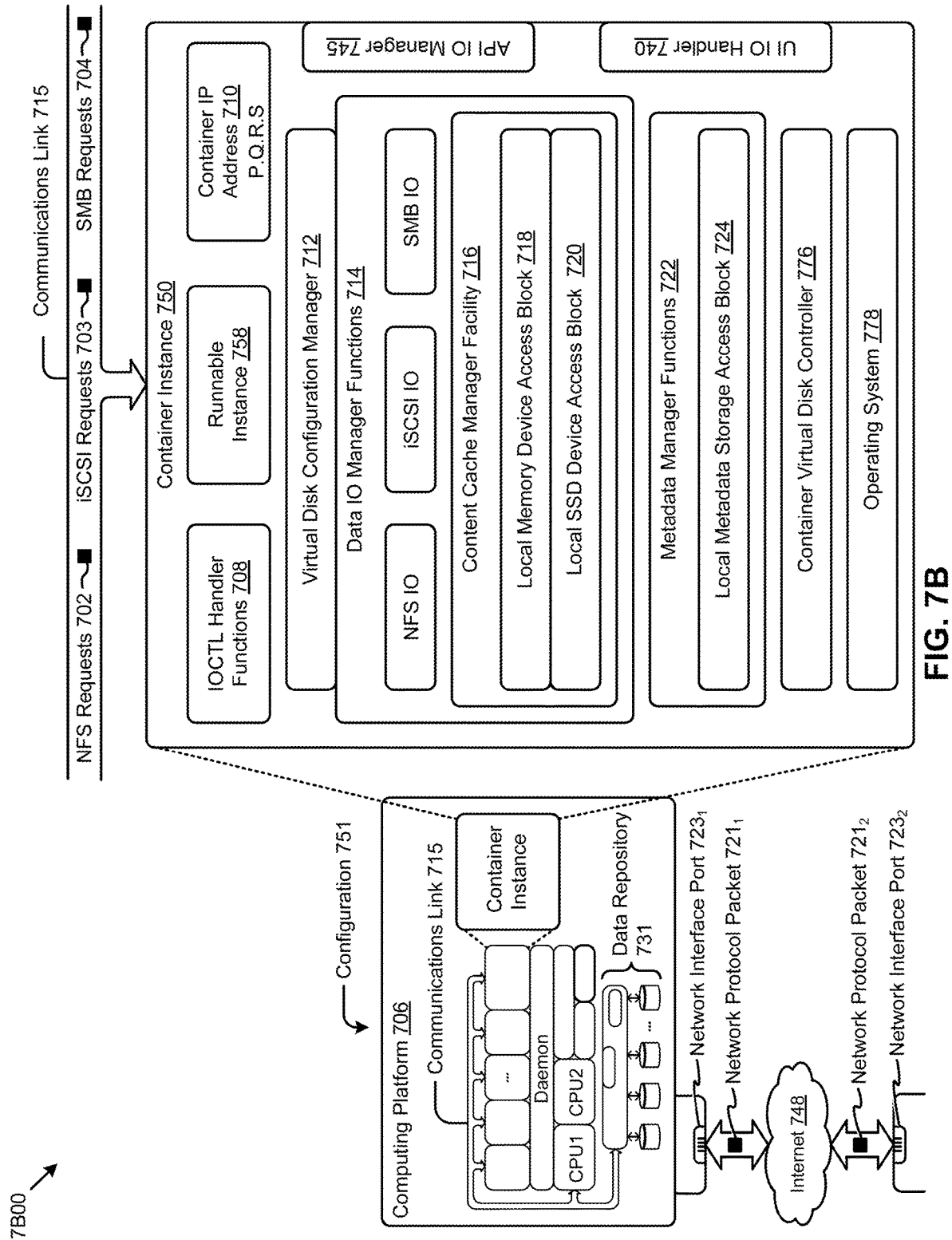

FIG. 7B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 778, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 776. Such a container virtual disk controller can perform any of the functions that the aforementioned CVM virtual disk controller 726, yet such a container virtual disk controller does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method, comprising:
   receiving a storage I/O command to access a first logical object corresponding to a first logical data block;
   executing, in response to the storage I/O command to access the first logical object, a defragmentation operation concurrently with servicing the storage I/O command by:
      identifying a plurality of logical data blocks being logically contiguous with the first logical data block corresponding to the first logical object, wherein the plurality of logical data blocks are identified based on at least a location of the first logical data block;
      selecting a physical data block referenced by a logical data block of the plurality of logical data blocks for defragmenting, wherein the physical data block maintains data for a different logical object from the first logical object; and
      defragmenting the plurality of logical data blocks by at least moving data in the physical data block to a different physical data block.

2. The method of claim 1, wherein the physical data block is selected based on at least a determination that any snapshots that reference the logical data block are expired and a block map characterizes an association between respective physical data blocks and one or more snapshots and the block map is analyzed to determine that any snapshots that reference the logical data block are expired.

3. The method of claim 2, wherein the first logical object and the different logical object are maintained on a storage pool constructed from respective storage devices directly attached to respective nodes of a plurality of nodes and the storage pool is managed using a plurality of block maps.

4. The method of claim 1, wherein the logical data blocks are bounded by a scan boundary.

5. The method of claim 4, wherein the scan boundary is based at least in part on one of, a read region, a write region, predicted time, or a measured time.

6. The method of claim 4, wherein the scan boundary is based at least in part on one of, a predicted time, or a measured time.

7. The method of claim 1, wherein the defragmentation operation completes before the storage I/O command completes.

8. The method of claim 1, wherein the defragmentation operation completes after the storage I/O command completes.

9. A non-transitory computer readable medium having stored thereon a sequence of instructions which, when executed by a processor causes a set of acts, the set of acts comprising:
   receiving a storage I/O command to access a first logical object corresponding to a first logical data block;
   executing, in response to the storage I/O command to access the first logical object, a defragmentation operation concurrently with servicing the storage I/O command by:
      identifying a plurality of logical data blocks being logically contiguous with the first logical data block corresponding to the first logical object, wherein the plurality of logical data blocks are identified based on at least a location of the first logical data block;
      selecting a physical data block referenced by a logical data block of the plurality of logical data blocks for defragmenting, wherein the physical data block maintains data for a different logical object from the first logical object; and
      defragmenting the plurality of logical data blocks by at least moving data in the physical data block to a different physical data block.

10. The computer readable medium of claim 9, wherein the physical data block is selected based on at least a determination that any snapshots that reference the logical data block are expired and a block map characterizes an association between respective physical data blocks and one or more snapshots and the block map is analyzed to determine that any snapshots that reference the logical data block are expired.

11. The computer readable medium of claim 10, wherein the first logical object and the different logical object are maintained on a storage pool constructed from respective storage devices directly attached to respective nodes of a plurality of nodes and the storage pool is managed using a plurality of block maps.

12. The computer readable medium of claim 9, wherein the logical data blocks are bounded by a scan boundary.

13. The computer readable medium of claim 12, wherein the scan boundary is based at least in part on one of, a read region, or a write region.

14. The computer readable medium of claim 12, wherein the scan boundary is based at least in part on one of, a predicted time, or a measured time.

15. The computer readable medium of claim 9, wherein the defragmentation operation completes before the storage I/O command completes.

16. The computer readable medium of claim 9, wherein the defragmentation operation completes after the storage I/O command completes.

17. The computer readable medium of claim 9, wherein the storage I/O command is a READ command.

18. The computer readable medium of claim 9, wherein the storage I/O command is a WRITE command.

19. A system comprising:
   a storage medium having stored thereon a sequence of instructions; and
   a processor that executes the sequence of instructions to cause a set of acts, the set of acts comprising:
      receiving a storage I/O command to access a first logical object corresponding to a first logical data block;
      executing, in response to the storage I/O command to access the first logical object, a defragmentation operation concurrently with servicing the storage I/O command by:

identifying a plurality of logical data blocks being logically contiguous with the first logical data block corresponding to the first logical object, wherein the plurality of logical data blocks are identified based on at least a location of the first logical data block;

selecting a physical data block referenced by a logical data block of the plurality of logical data blocks for defragmenting, wherein the physical data block maintains data for a different logical object from the first logical object; and defragmenting the plurality of logical data blocks by at least moving data in the physical data block to a different physical data block.

20. The system of claim 19, wherein the physical data block is selected based on at least a determination that any snapshots that reference the logical data block are expired and a block map characterizes an association between respective physical data blocks and one or more snapshots and the block map is analyzed to determine that any snapshots that reference the logical data block are expired.

21. The system of claim 20, wherein the first logical object and the different logical object are maintained on a storage pool constructed from respective storage devices directly attached to respective nodes of a plurality of nodes and the storage pool is managed using a plurality of block maps.

22. The system of claim 19, wherein the logical data blocks are bounded by a scan boundary.

23. The system of claim 22, wherein the scan boundary is based at least in part on one of, a read region, a write region, a predicted time, or a measured time.

24. The system of claim 19, wherein the defragmentation operation completes before the storage I/O command completes.

25. The system of claim 19, wherein the defragmentation operation completes after the storage I/O command completes.

* * * * *